(12) United States Patent
Baldovinos

(10) Patent No.: US 7,895,200 B2
(45) Date of Patent: Feb. 22, 2011

(54) INTELLIGENTADVISOR™, A CONTACT, CALENDAR, WORKFLOW, BUSINESS METHOD, AND INTELLIGENCE GATHERING APPLICATION

(76) Inventor: Jaime Baldovinos, 141 Richardson Dr., Mill Valley, CA (US) 94941

(\*) Notice: Subject to any disclaimer, the term of this patent is extended or adjusted under 35 U.S.C. 154(b) by 1186 days.

(21) Appl. No.: 11/457,700

(22) Filed: Jul. 14, 2006

(65) Prior Publication Data

US 2007/0041574 A1 Feb. 22, 2007

Related U.S. Application Data

(60) Provisional application No. 60/595,711, filed on Jul. 29, 2005.

(51) Int. Cl.
*G06F 17/30* (2006.01)
*G06F 7/00* (2006.01)
(52) U.S. Cl. ........................ 707/732; 707/608; 707/767; 707/944; 705/14.18; 705/35
(58) Field of Classification Search ........................ None
See application file for complete search history.

(56) References Cited

U.S. PATENT DOCUMENTS

| | | | |
|---|---|---|---|
| 6,236,980 B1 \* | 5/2001 | Reese | 705/36 R |
| 6,247,043 B1 | 6/2001 | Bates | |
| 6,798,413 B1 | 9/2004 | Tracey et al. | |
| 6,829,348 B1 | 12/2004 | Schroeder | |
| 6,970,830 B1 \* | 11/2005 | Samra et al. | 705/10 |
| 7,275,063 B2 \* | 9/2007 | Horn | 1/1 |

\* cited by examiner

*Primary Examiner*—Greta L Robinson
*Assistant Examiner*—James J Wilcox
(74) *Attorney, Agent, or Firm*—Steven A. Nielsen; Allman & Nielsen, P.C.

(57) ABSTRACT

The invention is a contact, calendar, workflow, and intelligence gathering application that allows a user, such as a financial advisor to collect, codify and analyze objective and subjective data regarding clients, corporate/institutional accounts, contacts/prospects, financial products and market trends. The invention assists a financial advisor in batch calling, scheduling work, delegating tasks and facilitating associative intellect, allowing a user to test hunches or "wispy thoughts" to discovery client and market trends.

3 Claims, 45 Drawing Sheets

```
n/a , n/a n/a  ID00019                                    Note View          Select Client Note to View
Total Notes on File: 7                                               Date      Time        Duration
        Most recent Note on file:6/23/2005, it was written (0) weeks ago.   6/23/2005  4:45:55 PM   003.7  NT00000459
        The earliest Note on file:3/11/2004, it was written (67) weeks ago. 6/22/2005  10:18:06 AM  002.1  NT00000356
        The current Note for:6/23/2005, was written (0) weeks ago.          6/10/2005  2:01:43 PM   000.2  NT00000422
                                                                            9/28/2004  10:45:25 AM  000.6  NT00000354
              Note Date: 6/23/2005          Notes
        The Client List Manager provides the FA with analytical tools to monitor clerical operations in regard
        to the assignment of tasks to designated personnel and see how much attention selected clients are
        receiving (or how tasks regarding a selected client are being handled by task assignees). One of the
        analytical tools provided by the Client List Manager is the Note record review feature that allows the
        FA to view Note records for selected date ranges. The FA is able to select a date range and review the
        documented points of contact with clients for the defined time window.

Financial Advisor(# when Note was written: Jaime Baldoumas/001

Scheduled Notes                                                               Target Dates
        Locate the documents for next meeting                                         6/27/2005
        Prepare trust account forms to be signed                                      6/28/2005
        Include client in the mailing list for XY and Z                               6/29/2005

List of used Sort Criteria: 11
        Page Header          Page #  Sort Criteria Type       Sort Criteria
        General Marketing    1       Focus Products-Helen     International Investing    FNCT0001
        General Marketing    1       Focus Products-Helen     Managed Futures            FNCT0001
        Retirement Concerns  2       Retirement Plans         Work 401k                  FNCT0002

List of Products Referenced: 3
        Product       Stock Company         Symbol   Bond Type    Purchase Type   Fund Family
        Mutual Funds  n/a                   n/a      n/a          n/a             American Fu
        Other Products n/a                  n/a      n/a          n/a             n/a
        Stocks        24/7 Media Inc        TFSM     n/a          n/a             n/a
```

Client and Contact/Prospects Notes Scheduler

All Dates / Assigned / All Dates / Not Assigned

View All

Scheduler Notes - Clients

All Dates — Total Scheduler Notes: 183

| Target Date | Scheduler Notes | Next Call | Assignment(s) | Last Name | Middle Name |
|---|---|---|---|---|---|
| 08/31/2005 | investment house, but is alone in making many | 9/1/2005 | 1 | Tod | |
| 08/25/2005 | at the point of contact with the Client or Contact | 6/30/2005 | 2 | Pastine | |
| 08/18/2005 | IntelligentAdvisor provides the Financial Advisor | 7/21/2005 | 1 | Brown | |
| 08/17/2005 | IntelligentAdvisor provides the Financial Advisor | 7/21/2005 | 2 | Brown | |
| 08/17/2005 | B.- In preparation to make batch calls to Clients | 6/30/2005 | 1 | Pastine | |
| 08/17/2005 | those contained in the MS Office suite. | 9/1/2005 | 2 | Tod | |
| 08/16/2005 | the Financial Advisor needs to spend reviewing cry | 8/26/2005 | 1 | Schumacher | |
| 08/15/2005 | viii.- As discussed above, the IntelligentAdvisor | 7/21/2005 | 1 | Brown | |
| 08/11/2005 | list of the clients the selected contact/prospect | 8/31/2005 | 1 | Haug | |
| 08/10/2005 | Thus, the significant change in workflow affected | 8/25/2005 | 3 | Ceruty | |
| 08/10/2005 | pects on file. The FA will therefore be able t | 8/31/2005 | 1 | Haug | |
| 08/09/2005 | Financial Advisor's use of high-quality concentrat | 8/25/2005 | 1 | Ceruty | |
| 08/09/2005 | web of defined internal relations centered on the | 8/31/2005 | 1 | Haug | |
| 08/09/2005 | Financial Advisor is able to quickly gain a sense | 8/26/2005 | 1 | Schumacher | |
| 08/08/2005 | Contact/Prospects are dedicated calling sessions w | 6/30/2005 | 1 | Pastine | |

Scheduler Notes - Contacts/Prospects

All Dates — Total Scheduler Notes: 85

| Target Date | Assignment(s) | Last Name | Middle Name | First Name | Cont/Pros ID | Current Tasks | Archived Tasks | Initiatin |
|---|---|---|---|---|---|---|---|---|
| 09/14/2005 | 2 | Johnson | | Benita | RL00012 | 2 | 0 | Corpor |
| 09/13/2005 | 2 | Johnson | | Benita | RL00012 | 2 | 0 | Corpor |
| 09/12/2005 | 1 | Johnson | | Benita | RL00012 | 1 | 0 | Corpor |
| 09/02/2005 | 2 | Platonious | Socraticus | Virgil | RL00002 | 2 | 0 | Contac |
| 08/31/2005 | 1 | Palloza | | Lola | RL00025 | 1 | 0 | Contac |
| 08/30/2005 | 2 | Palloza | | Lola | RL00025 | 2 | 0 | Contac |
| 08/26/2005 | 2 | Xing | | Huina | RL00010 | 2 | 0 | Contac |
| 08/23/2005 | 2 | Keynes | Maynard | Jim | RL00020 | 2 | 0 | Contac |
| 08/18/2005 | 2 | Garcia | Maria | Lola | RL00001 | 2 | 0 | Contac |
| 08/18/2005 | 1 | Palloza | | Lola | RL00025 | 1 | 0 | Contac |
| 08/18/2005 | 2 | Xing | | Huina | RL00010 | 2 | 0 | Contac |
| 08/16/2005 | 2 | Garcia | Maria | Lola | RL00001 | 2 | 0 | Contac |
| 08/11/2005 | 2 | Garcia | Maria | Lola | RL00001 | 2 | 0 | Contac |
| 08/09/2005 | 1 | Xing | | Huina | RL00010 | 1 | 0 | Contac |
| 08/04/2005 | 1 | Lucretiuos | | Homer | RL00021 | 1 | 0 | Contac |

| Display Sort Order: Date | | | | Client Activity Summary Product View | | Reselect Order Grid Display by: Last Name | |
|---|---|---|---|---|---|---|---|
| Product Select: Bonds, Bond Select: CD's, Purchase Type: Primary CD's. | | | | | | | |
| There are (9) instances of Product References for the Product Select on file. Sort Order: Date. | | | | | | | |
| Last Name | First Name | Middle Name | Date | Originating Application | Status | Activity Note | |
| Chrity | Ann | | 09/15/2004 | Notes | Client | | |
| Martin | Eliseo | | 08/25/2004 | Contact / Prospect List | Contact/Prospect | | |
| Barrichelo | Rubens | | 05/03/2004 | Notes | Client | | |
| Pastine | Luigi | | 03/01/2004 | Notes | Client | The reason the two different methods of | |
| Johnson | Benita | | 02/24/2004 | Contact / Prospect List | Contact/Prospect | | |
| Johnson | Benita | | 01/30/2004 | Contact / Prospect List | Contact/Prospect | | |
| Platonious | Virgil | Socraticus | 01/30/2004 | Contact / Prospect List | Contact/Prospect | | |
| Schumacher | Michael | | 01/14/2004 | Contact / Prospect List | Contact/Prospect | | |

Contact/Prospect Status: Contact: Martin, Eliseo , Affiliation:
From: Sausalito, / Next Call: 06/30/05/ Active Status: Yes/ Active Relationship - Start: 03/31/04 - End: 03/30/24

The selected Note record was created on: 08/25/2004

Q: Kimi, third place, are you happy with that?
KR: Yeah, it was the best that they could do. I think we were taking a little bit of a risk in the middle of the race to try to pass Rubens. We did quite a short fill on the second stop but it didn't pay off but we tried to win the race and not come second so I am not too disappointed to lose second place.

FIG. 34

INTELLIGENTADVISOR™, A CONTACT, CALENDAR, WORKFLOW, BUSINESS METHOD, AND INTELLIGENCE GATHERING APPLICATION

CROSS-REFERENCE TO RELATED APPLICATIONS

This application claims the benefit of U.S. provisional application No. 60/595,711, filed on Jul. 29, 2005, which is incorporated herein by reference.

STATEMENT REGARDING FEDERALLY SPONSORED RESEARCH OR DEVELOPMENT

Not Applicable.

REFERENCE TO A SEQUENCE LISTING

Not Applicable.

BACKGROUND OF THE INVENTION (1) Field of the Invention

This invention relates to informational, workflow, marketing analysis, calendaring and contact management system and new business methods suitable for professionals, such as Financial Advisors.

(2) Description of the Related Art

Other contact management systems are known in the art. However, these products fail to meet the needs of a Financial Advisor (FA) as means for associating contact data variables.

U.S. Pat. No. 6,247,043 by Bates provides means of name lookup based upon predetermined search criteria but fails to allow a user the ability to create search criteria with user defined data fields.

U.S. Pat. No. 6,829,348 by Schroeder provides means to monitor customers' preferences for products or services but fails to provide a user means to test a hypothesis regarding contact associations or trends in contact behavior.

U.S. Pat. No. 6,798,413 by Tracey discloses a workflow management system where contacts are moved from one predetermined category to another. Tracey fails to provide means to create new contact categories or means to prioritize workflow on a dynamic basis or upon user-defined criteria.

Thus, there is a need in the art for a contact management, workflow management and an intelligence gathering application that allows for user defined data fields, testing of hunches regarding contact trends, and integrated note taking.

BRIEF SUMMARY OF THE INVENTION

The present invention overcomes many short falls in the related art by facilitating the associative powers of the user, such as a Financial Advisor (FA) to create new workflows and discover relationships and trends.

IntelligentAdvisor™, (the invention) provides useful features not found in the related art, such as providing actionable marketing information, visual time series analysis, multivariate analysis, workflow changes, dynamic client profiles, and user created sort criteria for ongoing client notes and analysis of client needs.

The invention provides significant advantages not found in the related art by allowing a user to define relational parameters. A FA is able to note and test for possible relationships between a client and other groups of individuals or other data elements as entered by the FA.

The invention overcomes shortfalls in the related art by providing means and methods to continually update contact information during every call or meeting with a contact or person connected with a contact.

The invention provides an integrated note taking, intelligence gathering, contact management, marketing, business method(s) and a workflow management application that facilitates a user's associative intellect to discover trends, associations, marketing opportunities and workflows that are more efficient. The invention provides means and methods of collecting, codifying, and managing products in dynamic relation to contacts or clients as ongoing summaries of discussions with contacts are recorded, codified, and categorized.

The invention allows a user, such as a FA, to collect, codify, and categorize subjective and objective information obtained from clients, contacts, or prospects. The information collected may be compared or coordinated with product information and analyzed by user defined categories or sort criteria.

A key feature of the invention is the sort criteria system that allows the recording and codification of issues and concerns of clients or contacts. As a FA communicates with a contact additional objective and subjective information may be sorted or reviewed by criteria that may be changed during operation of the application or "on the fly".

The invention allows users and even encourages users to test their own hunches or Wispy Thoughts as to possible associations between clients, other service providers to clients, products and other user defined data and sub-data fields. The testing of data relationships generates static views and trend views of client preferences and perceived needs.

The invention produces calendars, workflow priorities and suggestions, new business methods, contact lists and information, product compatibility analysis, relational database analysis, letter and document generation, SEC compliance report generation and workflow management systems for users and/or their assistants.

The present invention includes a computer program product suitable for contact management and other tasks utilized by professionals, such as a FA. The present invention includes the business methods and functions of:

(1) Gathering and entering data regarding contacts and products;
(2) Continually updating data during interaction with contacts and as new product information is obtained;
(3) Testing hunches or Wispy Thoughts regarding possible correlations or trends in the collected data; and
(4) Using the results of Wispy Thought tests to change workflow and marketing efforts.
(5) Repeating steps 1-4 while performing new searches or Wispy Thought tests by creating user-defined sort-criteria or new keyword searches.
(6) Repeating steps 1-5 and adding new key-words or sort-criteria to the data structures of new and old contacts.

The invention includes a computerized system for assisting a user in providing service to clients. The computerized system includes a computer program product and a computer system for entering, printing, displaying, storing, and processing information.

The disclosed computer program product includes program functions for creating, changing, displaying and/or analyzing:

Contact lists
Relationships between contacts and others
Relationship Parameters
Notes for each contact Workflow of the FA and/or their assistants
Marketing concepts
Market segmentation
Associative experimentation by the FA
Sort Criteria
Product references
Batch call sessions
Client next call lists
Letter generation
Dynamic contact, prospect and client profiles
Changes in contact needs and preferences
Time lines
Delegation and monitoring of tasks An object of the invention is to allow a FA to capitalize on their associative intellect to develop and apply a customized Marketing Concept to the long-term deployment of the FA's personal resources (and assigned personnel) to effectively meet the needs and demands of clients by analysis of identified market niches and other criteria chosen by the FA.

A unique feature of the invention is the writing of Note records, each of which may be coded with Sort Criteria and annotated product references. The Sort Criteria are codes that reflect an issue, concern or topic that may be of interest to the FA's client base.

A FA may perform extensive preparation work using the Sort Criteria function. Issues and concerns that come up in discussions with clients may be codified into Sort Criteria. Subsequently, during contact with a client, the FA may tag or enter Note records with the new Sort Criteria. This invention allows a FA to maintain different sets of Sort Criteria for all contacts, thus allowing the FA to create Sort Criteria that captures the unique characteristics of her/his client base.

This invention provides the FA with a seamless integration of the customer facing operation with the internal back office operations (the Task Manager function). While in consultation with a contact, a FA may summarize the pertinent points with text entries and after selecting Sort Criteria/product references, may schedule and set target dates for new task assignments. The FA may delegate the assignments to appropriate personnel. The FA may track assigned tasks through completion with the Task Manager.

The FA may approach an individual as a contact or prospect, stand-alone client, a spouse that makes the investment decisions, a representative of a corporate-institutional account or a party in a trust account. The FA is able to efficiently record deliberations with service providers such as accountants, lawyers and other professionals involved in providing complex services to existing clients. Thus, dynamic client profiles are created for an individual from the beginning of the relationship, through various stages including that of various relationships with other clients and parties who may represent family or corporate-institutional accounts.

This invention has an automated next call function. While writing a Note record, the FA may enter or key in a topic and date for the next call and schedule tasks to complete prior to the next call date. For the daily routine of making phone calls, prior to each call, the FA creates annotated next call lists and executes calling list sessions through a window that displays each client's documented history and dynamic client profile. While speaking with contacts, the FA is fully informed of the parameters of the evolving relationship and is able to start the consultation with the closing point of a prior conversation. As each call is completed the next call record is removed from the list until the FA's batch calling session is completed.

This invention provides analytical tools to view a client base from multiple points of view. The FA may execute multivariate queries and perform visual time series analyses of Sort Criteria and annotated Product References. The FA can select sub-sets of Note records by client FIG. 32A date range, related groups FIG. 38 of clients-contact/prospects, corporate-institutional accounts or user-defined Sort Criteria FIG. 35. Through the use of the querying functions the FA can search the database for groups of clients which may constitute clear and distinct market niches that may require special attention. The results of such searches may help identify market niches and create letters and address labels to reach identified market segments. The resulting identification of market niches and long term trends provide the FA with the basis to continuously review the FA's means and methods of approaching clients.

The FA may set Next Call dates during contact with interested parties. The FA may organize all the Next Call dates into thematic groupings. When the FA is about to make calls to contacts, she has access to all records of codified conversations for each party contacted.

The invention provides means and methods of creating and generating mailing lists and letters to groups of contacts. The FA may generate mailing list distributions based upon client expressed product references, geographic location, sort criteria, and client Group Types and Client Groups. The FA may rapidly contact contacts and identify points of interest in relative importance to each other. The FA can discern emerging trends of Client and Prospect interests, identify, and target market niches. As emerging trends are discerned the Letter Generator may create mailing lists and personalized letters to appropriate contacts.

BRIEF DESCRIPTION OF THE SEVERAL VIEWS OF THE DRAWINGS

FIG. 9B is an isolated screen view of create client next call list: maintenance.

FIG. 9C is an isolated screen view of notes products.

FIG. 9E is a screen view of create next call list: stocks.

FIG. 9F is a screen view of a FA created user header, next call work window.

FIG. 9G is a screen view of a FA created user header, next call work window.

FIG. 9H is a screen view of a dynamic client profile display window.

FIG. 11 is a screen view of Client Note.

FIG. 12 is a screen view of High-Low Priority Matrix sort criteria entry screen.

Figure 15:
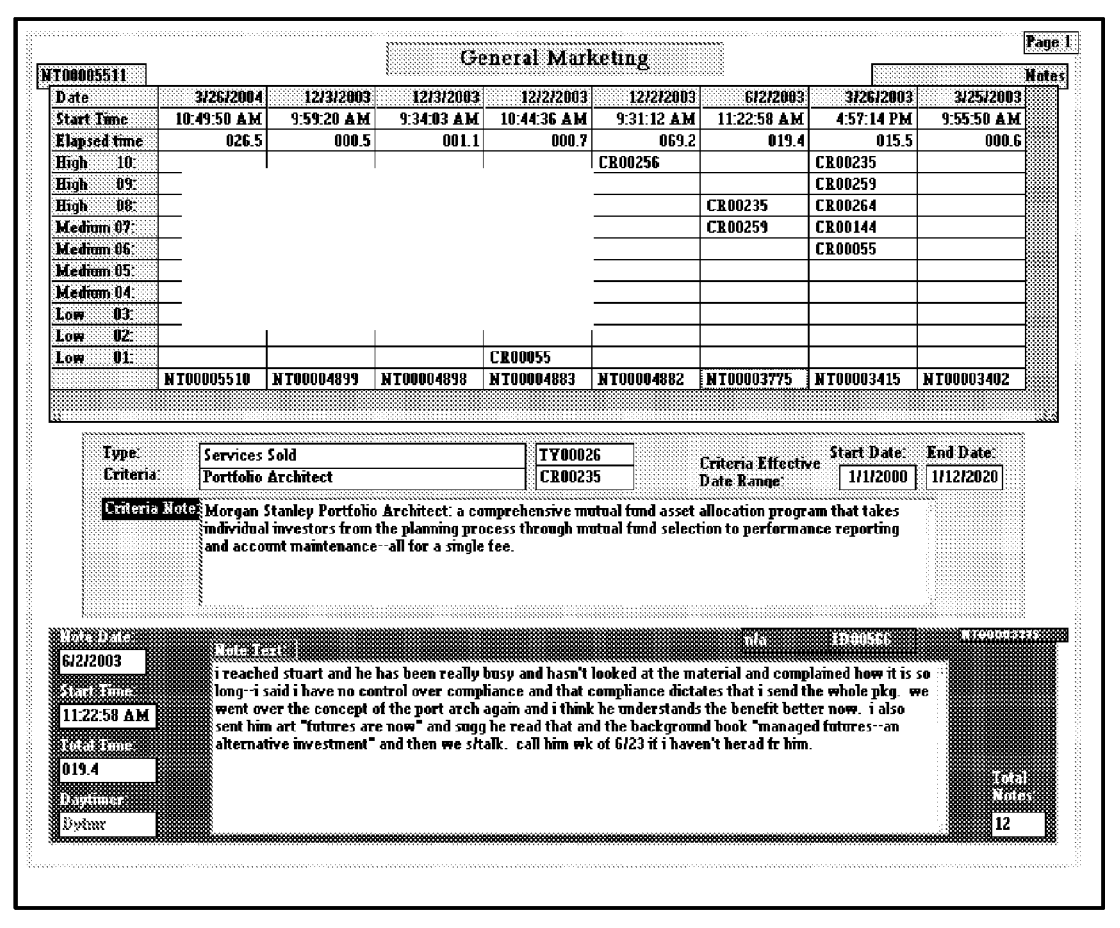

FIG. 15 is a screen view of user High-Low Priority Matrix time display grid with text references.

FIG. 16 is a screen view of client and contact/prospects—notes scheduler.

FIG. 18 is a screen view of scheduler—task assignments (clients).

FIG. 19 is a screen view of notes task assignments: manager.

FIG. 20 is a screen view of notes archived tasks assignments.

Figure 22:
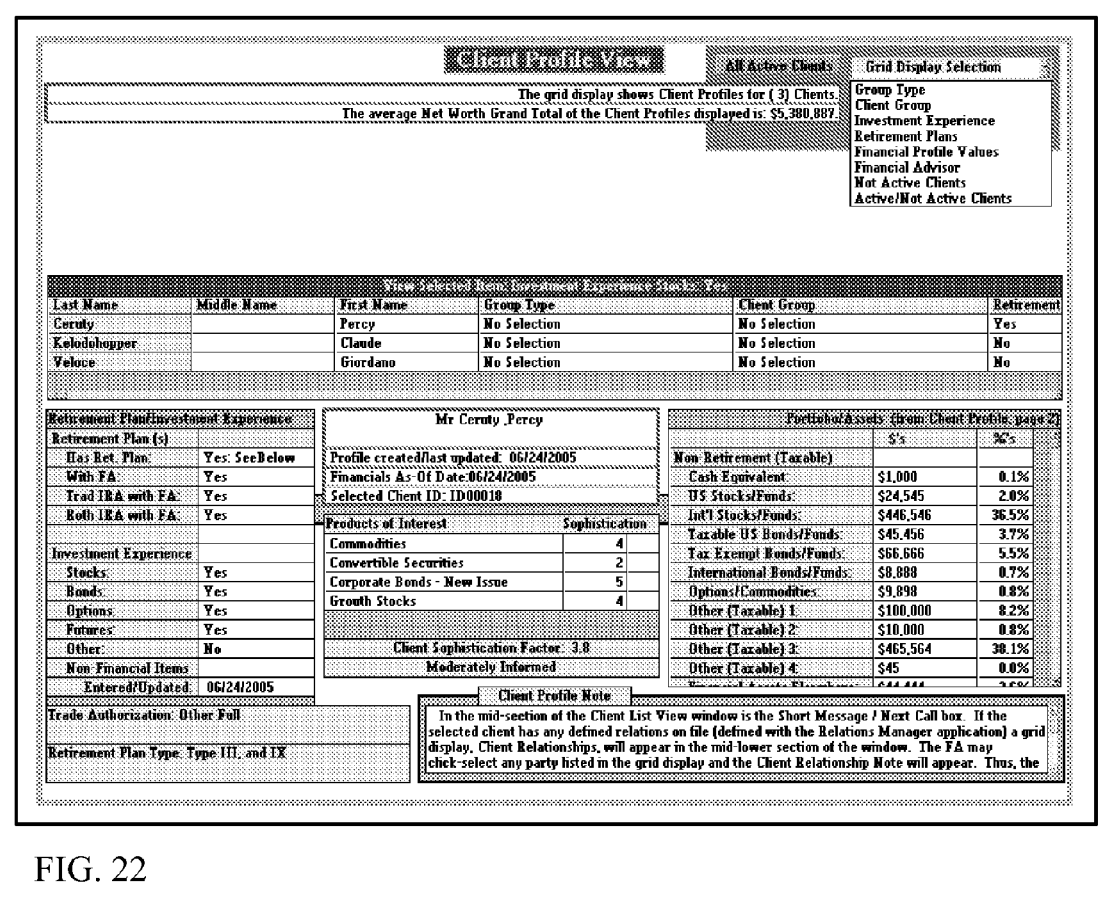

FIG. 22 is an isolated screen view of client profile view.

Figure 23:
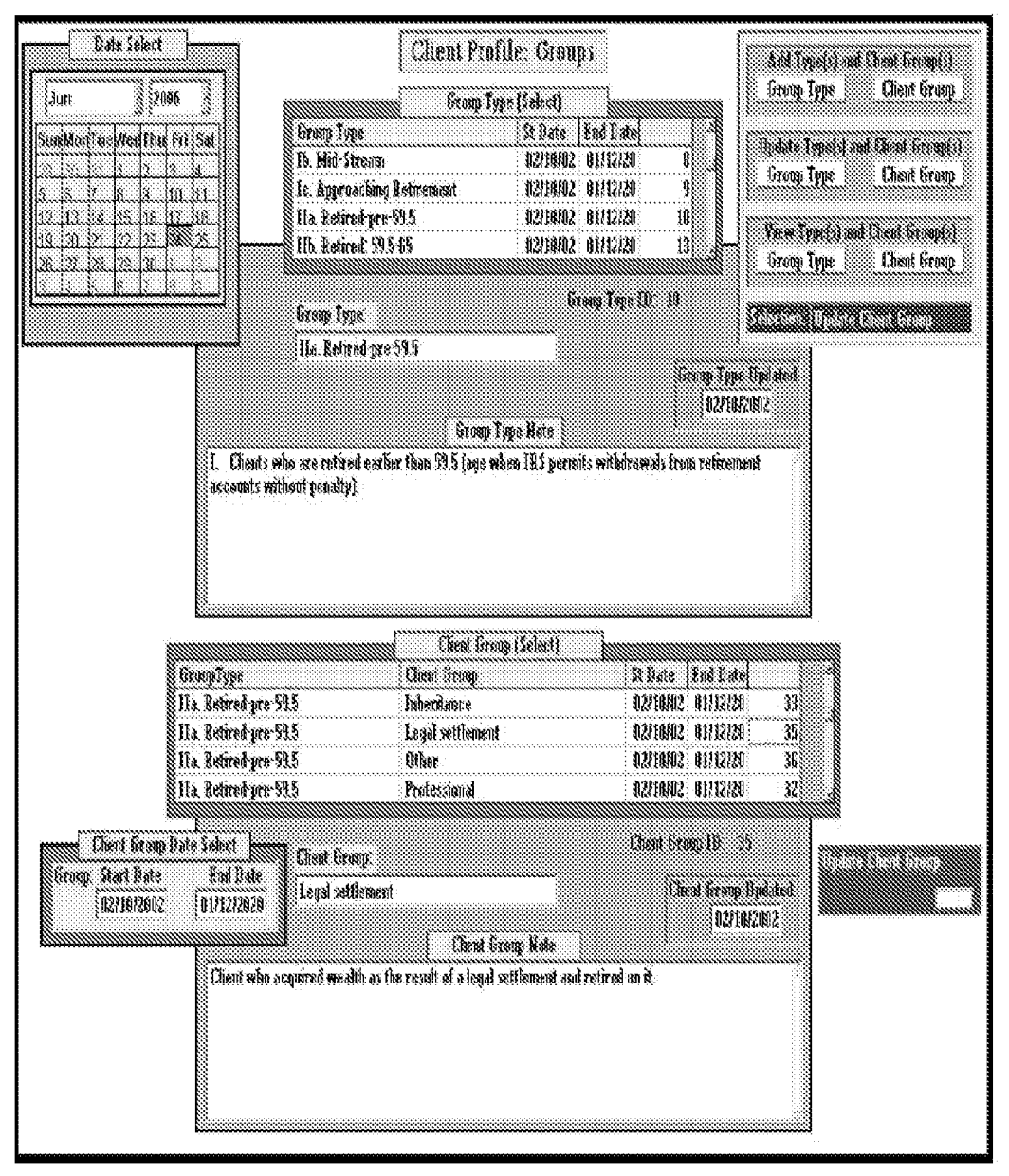

FIG. 23 is a screen view of client profile: groups.

FIG. 34 is a screen view of notes-selected product view, II expanded.

DETAILED DESCRIPTION OF THE INVENTION

A portion of this disclosure contains material which is subject to copyright protection. The copyright owner has no objection to the reproduction by the USPTO of this disclosure, but otherwise reserves all copyrights whatsoever.

The following is a partial list of definitions. Other definitions are given in the specification herein.

| Definition List 1 | |
|---|---|
| Term | Definition |
| FA | Financial Advisor |
| Financial Advisor | A person engaged in the task of advising others on financial matters and/or recommending the purchase of financial products. |
| IntelligentAdvisor ™ | The present invention. |
| Marketing Concept | A method of large-scale business enterprise administration. |
| Note Record | A running record or data structure of contact information that is constantly amended during the relationship with the contact. |

| Definition List 1 -continued | |
|---|---|
| Term | Definition |
| Sort Criteria | Codes that reflect an issue, concern or topic that may be of interest to the Financial Advisor's client base. Sort Criteria may be user defined and used to search for associations or trends. |
| Wispy Thought | A hypothesis by the user or Financial Advisor regarding possible associations. |
| Contact Information | Includes all information collected regarding a contact. Such information includes, but is not limited to, name, address, personal information, preferences, products purchased, product information requested, long and short term goals, and references to other contacts or service providers. |

In the following detailed description of the preferred embodiment, reference is made to the accompanying drawings that show by way of illustration the graphical user interface, functions and other aspects of the invention.

Figure 21:
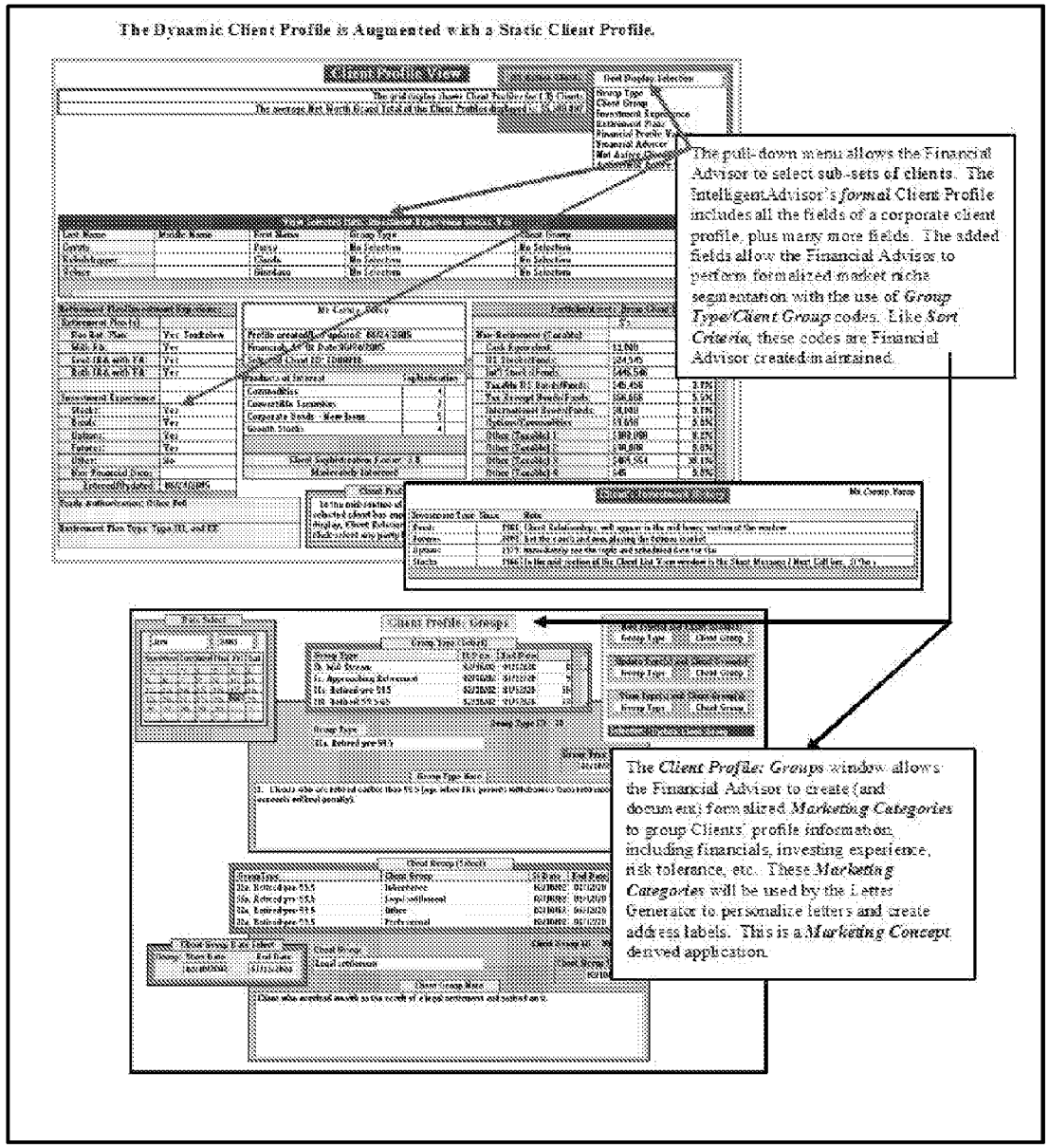
FIG. 21 is a group screen view of client profile view.
Figure 24:
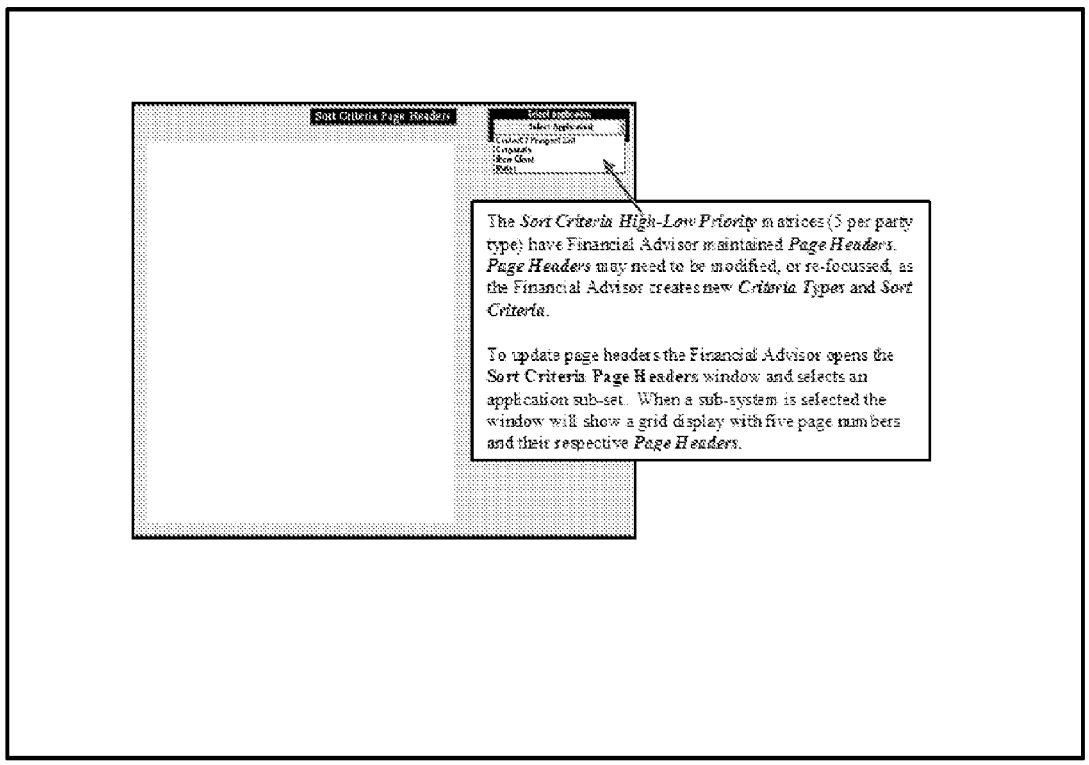
FIG. 24 is a screen view of sort criteria page header.
Figure 25:
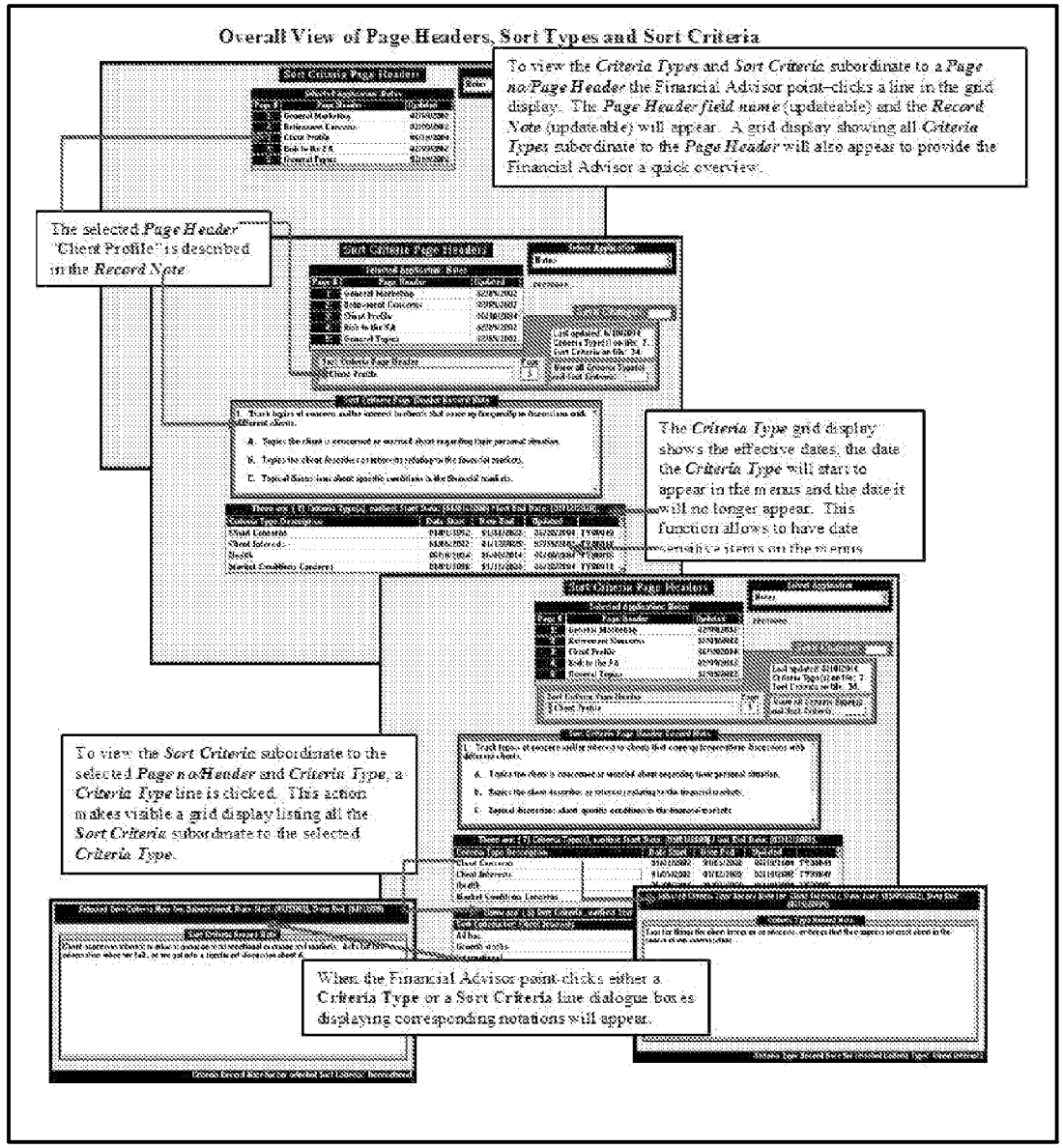
FIG. 25 is an overall screen view of page headers.
Figure 32A:
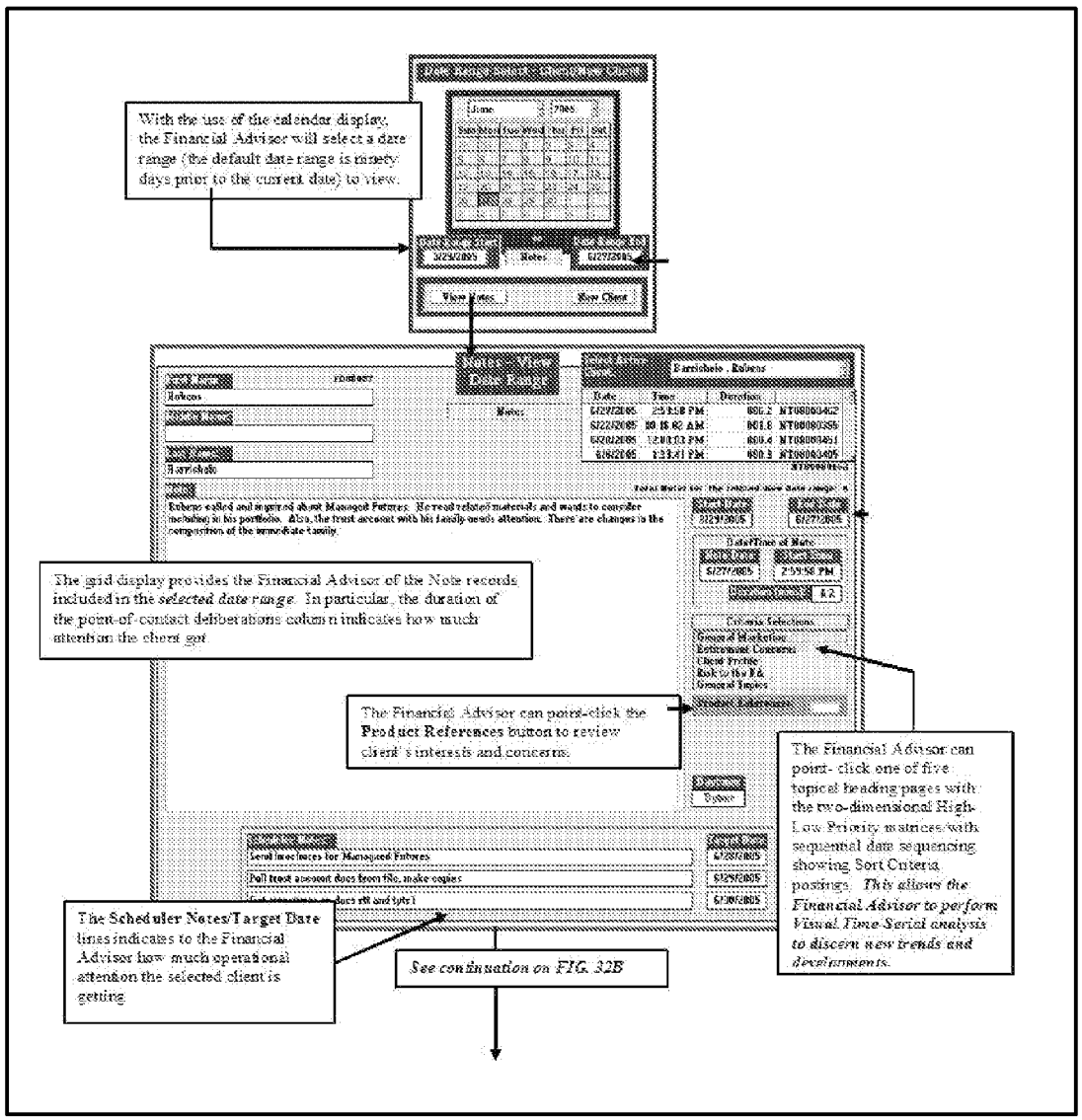
FIG. 32A is a screen view of date range select-client/new client.
Figure 32B:
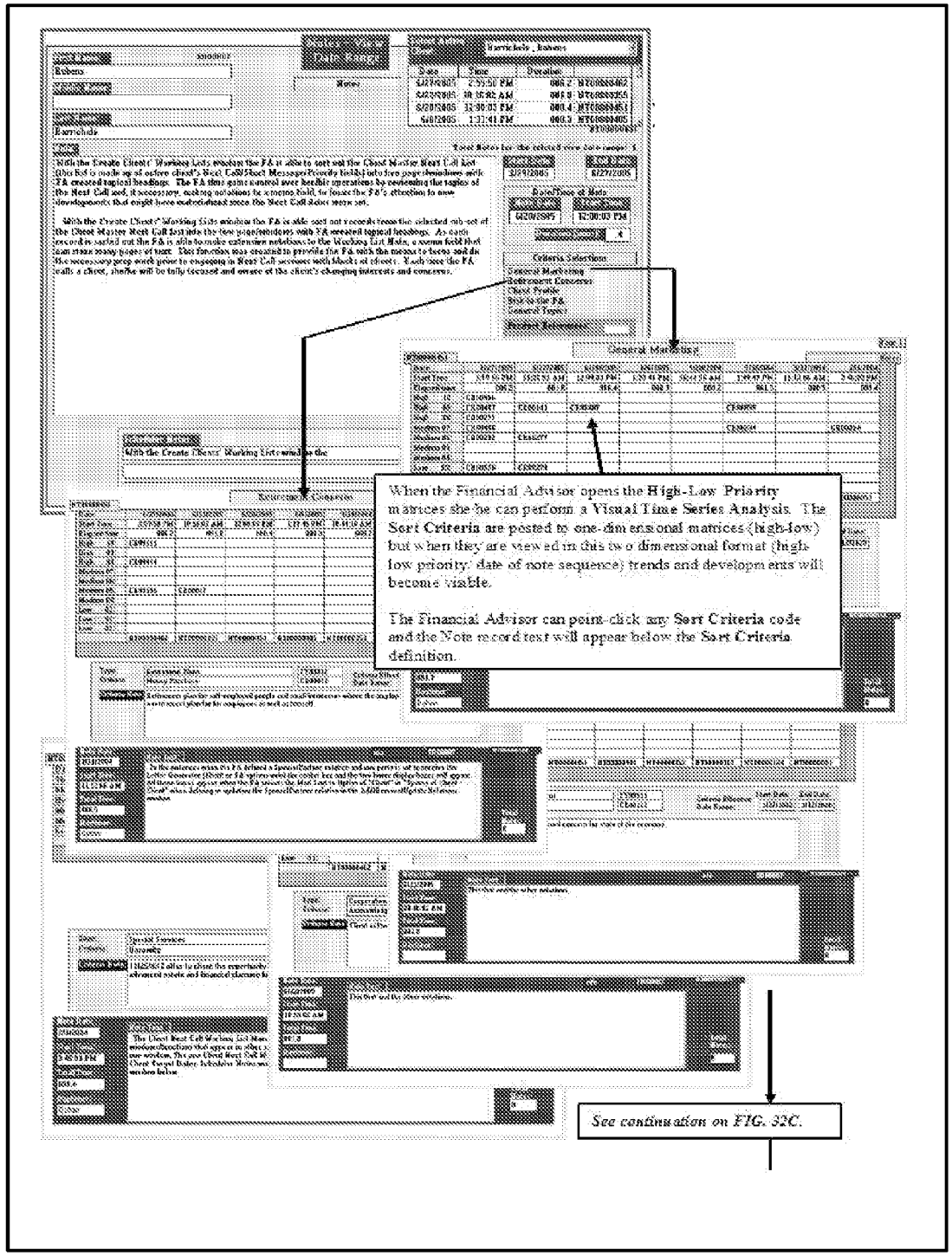
FIG. 32B is a screen view of notes-view date range.
Figure 32C:
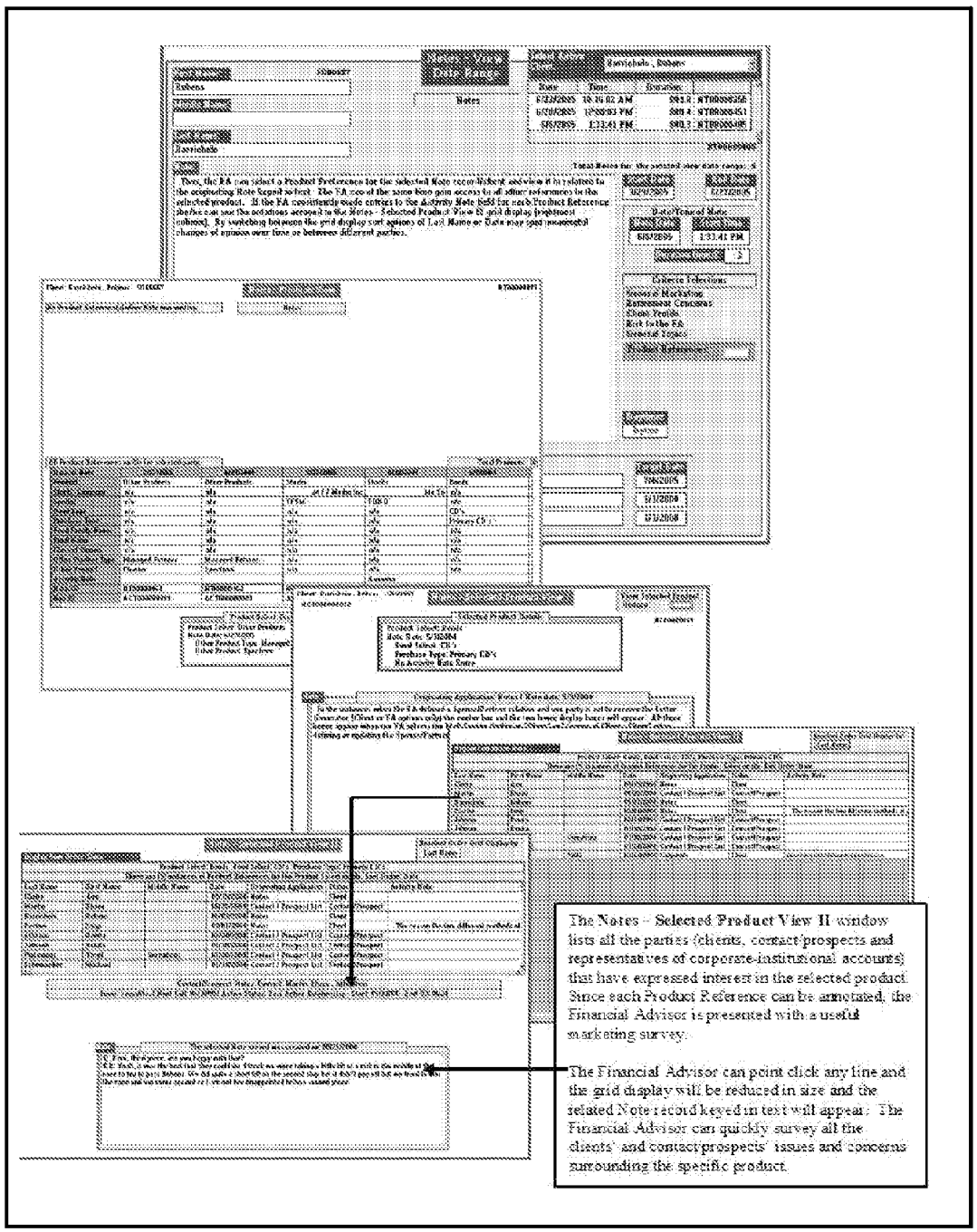
FIG. 32C is a screen view of notes-selected products view I and II.
Figure 33:
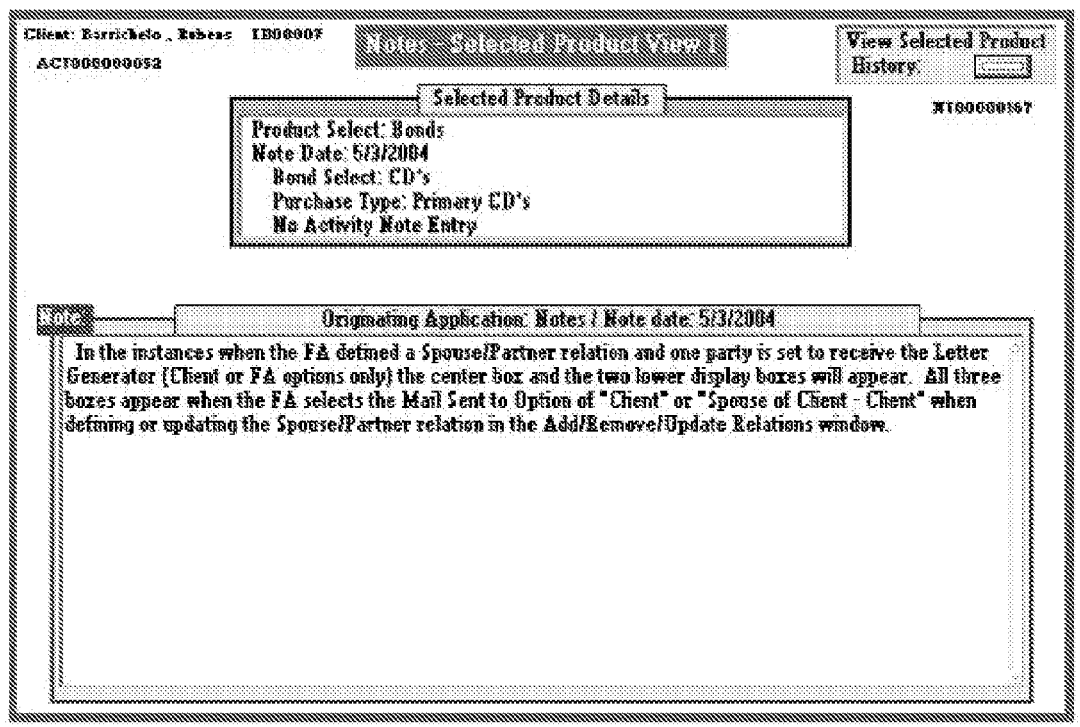
FIG. 33 is a screen view of notes-selected product I view, expanded.
Figure 35:
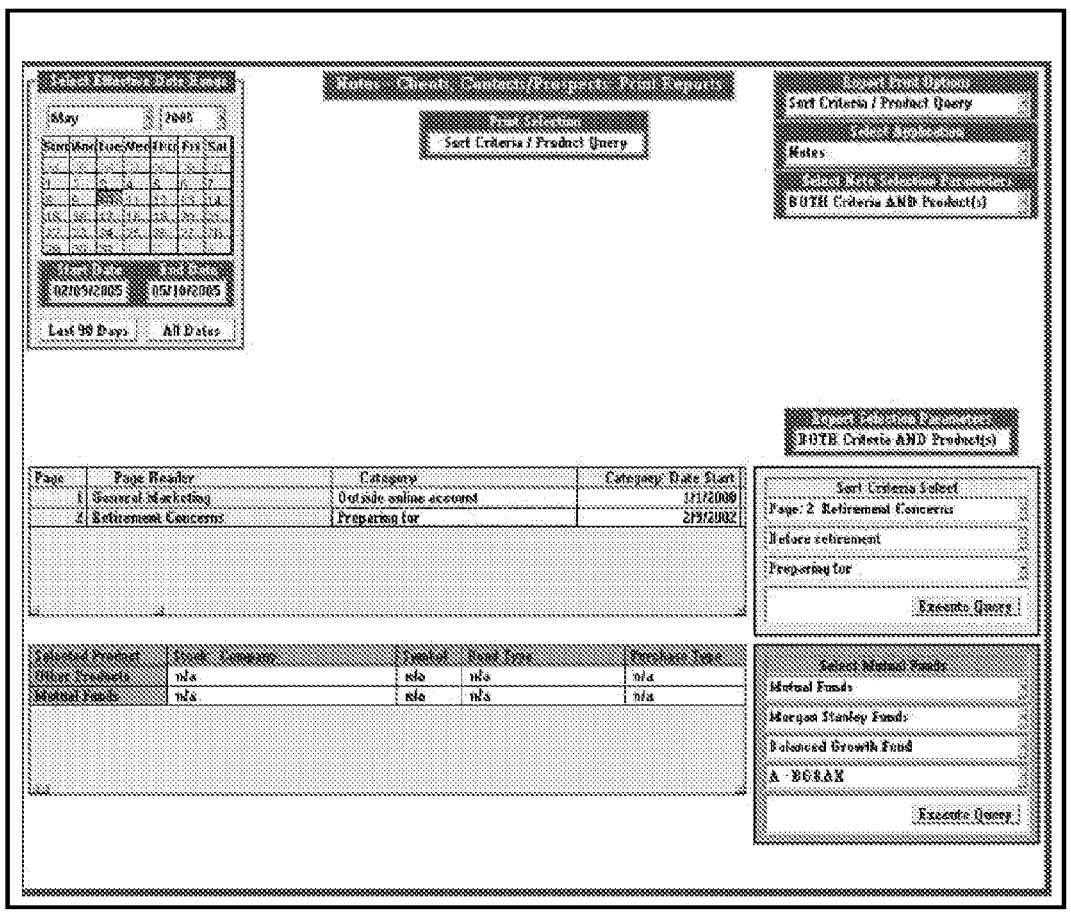
FIG. 35 is a screen view of notes sort criteria/product selection multivariate selection to print report.
Figure 36:
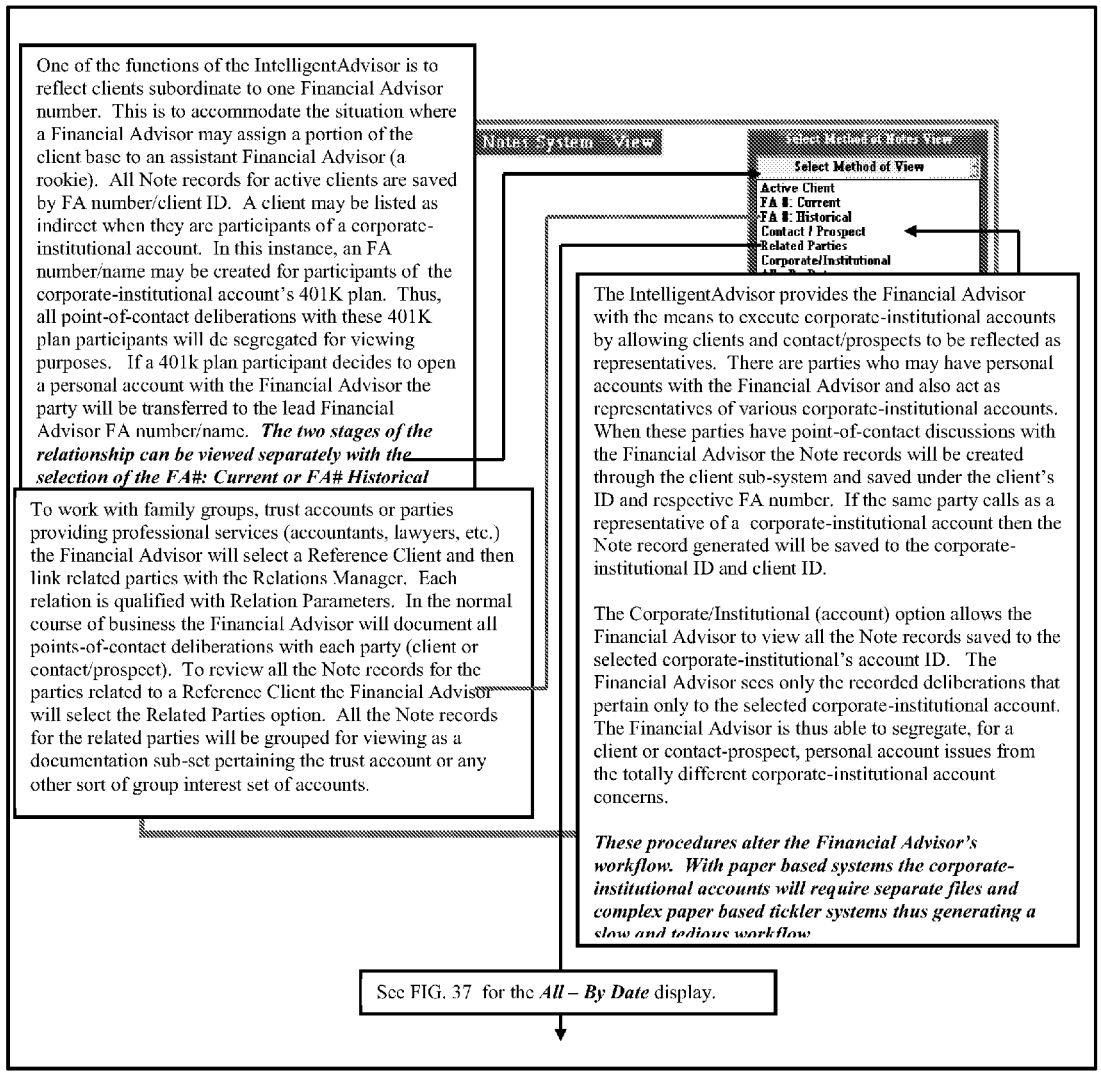
FIG. 36 is a screen view of select method of notes view.
Figure 37:
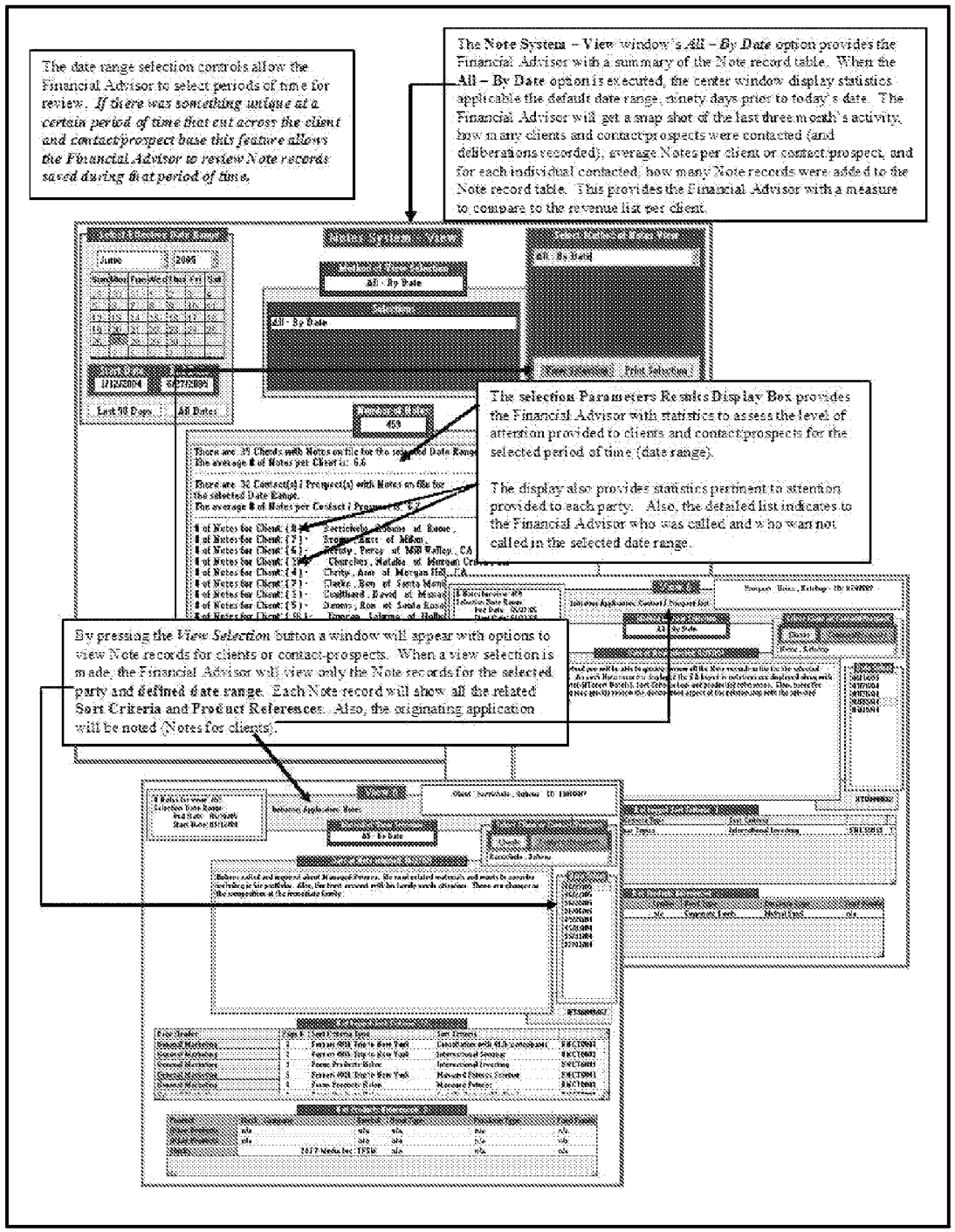
FIG. 37 is a screen view of notes system-view group.
Figure 38:
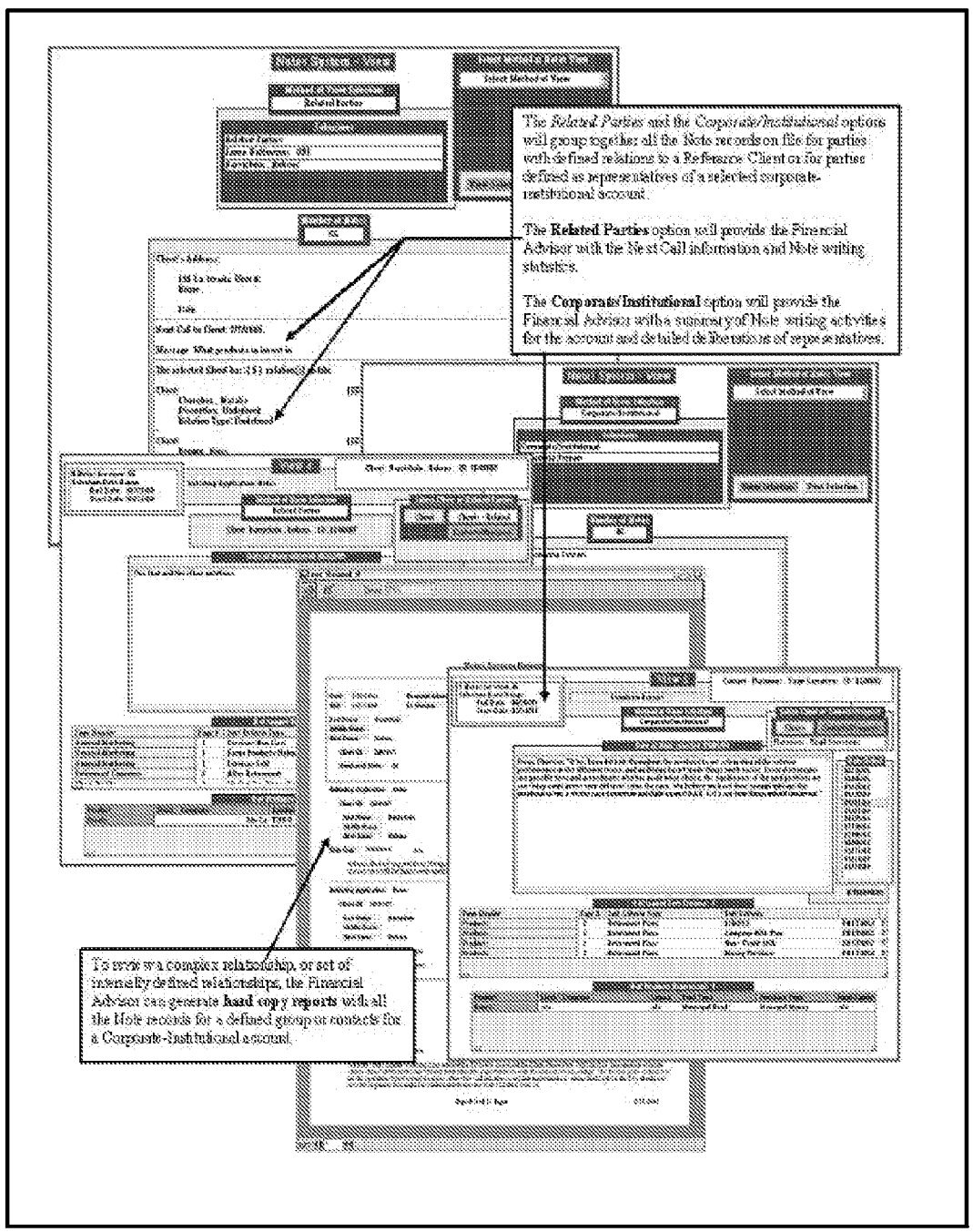
FIG. 38 is a screen view of related parties and corporate/institutional options.
Figure 39:
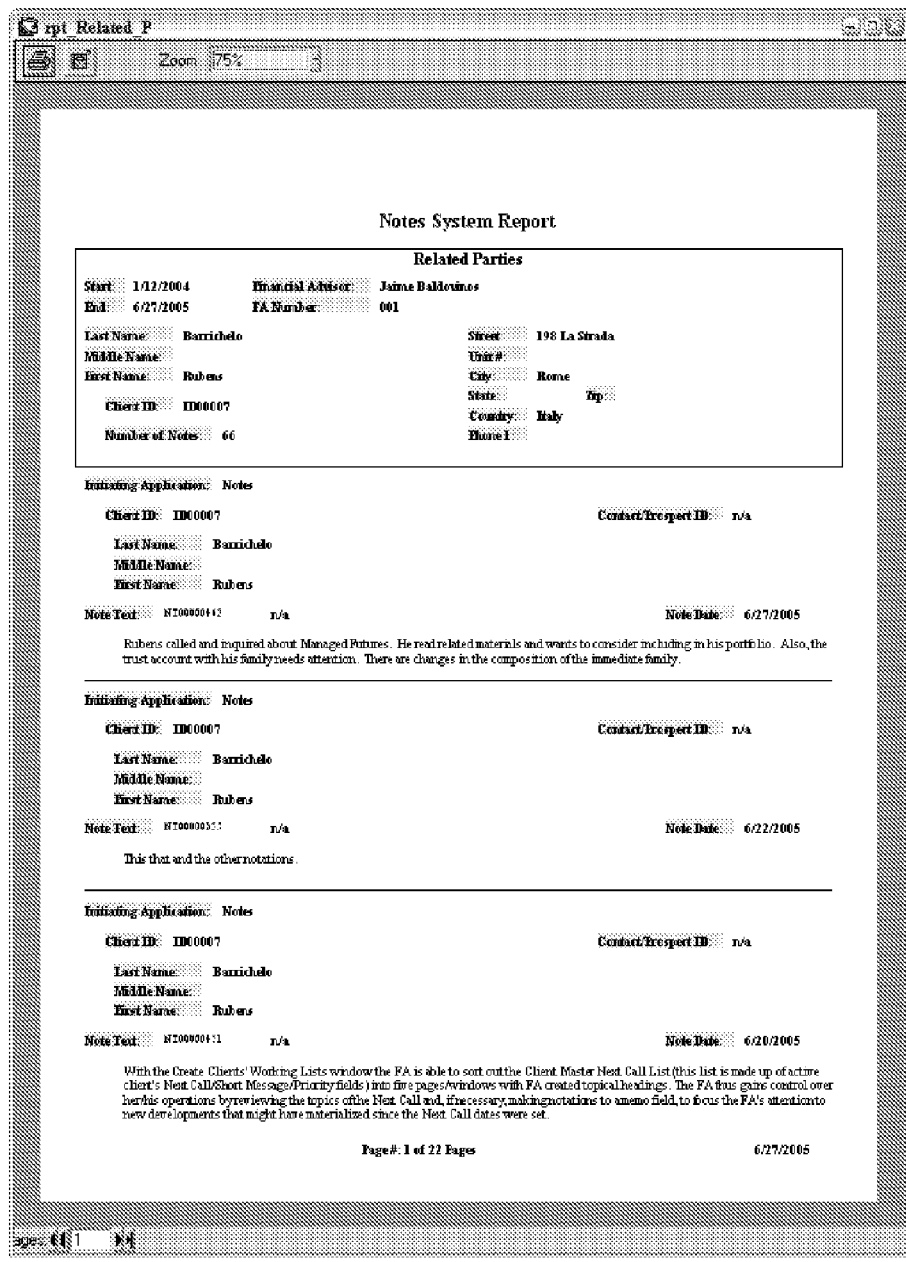
FIG. 39 is a screen view of notes system report.

The invention provides the FA with the ability to track relationships with parties staring at the prospect stage and progressing through the various stages of a client relationship. This is the basis for the integral concept of "dynamic client profile" FIG. 21, or "dynamic prospect profile". At each stage of the relationship and at each point of contact the FA uses the Sort Criteria sub-system to create Sort Criteria that captures the specific issues of importance to the prospect or client, FIG. 12. At each point of contact with a prospect and client, the FA tags the textual entries to the Note record, FIG. 11 with Sort Criteria. The Sort Criteria are placed in high-low priority matrices, FIGS. 14, 15, and 25. The placement of various Sort Criteria in the high-low priority matrices allows the FA to make complex statements by placing different Sort Criteria in positions of relative importance to one another. That is, by conversing with a client the FA may notice that Sort Criteria A is less important than C but more important than D. The FA is therefore able to capture subtle subjective conditions that otherwise may not be recorded in a manner that is immediately readable in isolation or in view of a range FIG. 36 of Note records FIG. 32B for a client, selected group of people FIG. 37 and FIG. 38 or product FIGS. 32C, 33, 34, and 35.

The "dynamic client profile" is carried to every aspect of the FA client relationship. The invention provides the FA the means to service corporate-institutional accounts. Clients, prospects and contacts already in the system can be listed as representatives of a corporate-institutional account. Any contact with any of these individuals regarding the affairs of a corporate-institutional account will be documented with a dedicated corporate-institutional account Note record. The corporate-institutional account Note records will be tagged by a dedicated set of Sort Criteria (which the FA creates and maintains specifically for the corporate-institutional accounts). The FA will thus create and maintain a "dynamic corporate-institutional profile" from recording deliberations with contacts and service providers such as accountants and lawyers.

The "dynamic client profile" is further developed with the grouping of clients, prospects and contacts under a reference client. The FA is thus able to effectively track the complexities of trust accounts, which may involve various family members and professional service providers. At the point of contact with any of the related parties the FA will record the deliberations with Note records tagged with Sort Criteria. Thus for a group relationship the FA may discuss issues with professional contacts (using Sort Criteria applicable only to contacts and prospects) and clients (using Sort Criteria applicable only to clients). At any given moment the FA has the capability to select for review all the Note records for parties related to a reference client.

Figure 31:
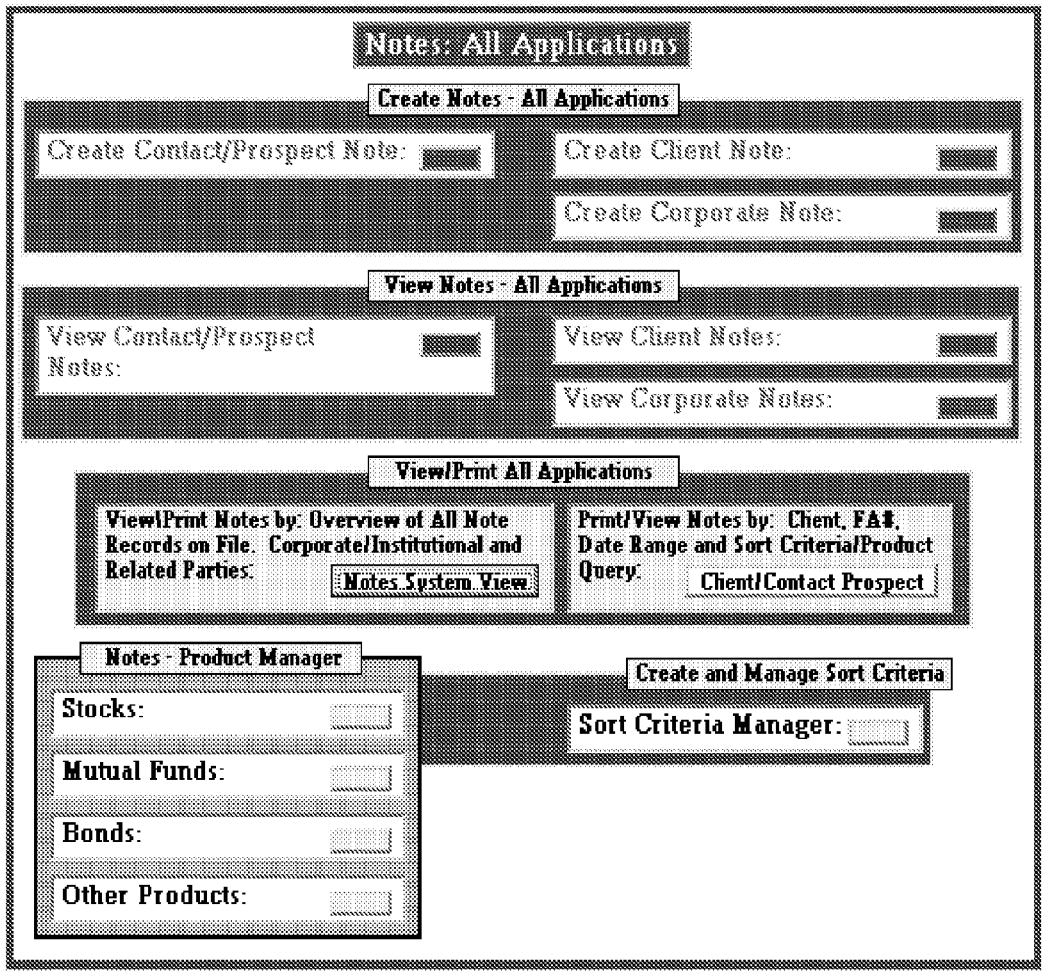
FIG. 31 is a screen view of notes: all applications.

The invention provides the FA with a "dynamic client profile" that will include personal interests and concerns, concerns regarding the corporate-institutional account(s) the individual may represent, and the concerns of the individual in a family relationship implicit in a trust account. The "dynamic client profile" may include records from the start of the relationship as a prospect or a contact. The FA is provided with one Note record selection function FIG. 31 whereby all the Note records for the client are selected and each is identified by source, the client's own individual account concerns, the client's concerns as a representative of corporate-institutional accounts. The FA may select the Note records for all the parties listed as related to the reference client and thereby view all the Note records for related parties, family members and contact-service providers.

From the point of view of such an expansive view of the client, contact and prospect base the FA will see emerging trends and patterns. The FA will therefore be able to create new Sort Criteria that will apply to the new clients, clients, contact/prospects and corporate-institution accounts. The FA will create Sort Criteria as hypothesis to be tested in the field. At the point of contact with the various parties the FA will then apply these new Sort Criteria, wispy thoughts, to qualify textual entries to the Note records. This way, hypothesis or Wispy Thoughts will be used as the methodical and systematic way to gain objective insight into the evolving interests and concerns of the client-prospect base. This insight will then be the basis for the FA to reallocate her/his resources to more effectively serve the revenue generating clients (or to turn prospects and contacts into revenue generating clients).

The invention includes a method of inputting, recording, analyzing, and memorializing ongoing conversations with clients and client representatives. This method includes entering data into the Note database. Information entered into the Note database is available to all functions. Each function may refer to the Note database and perform sorting or search functions based upon user defined Sort Criteria or parameters.

Figure 30:
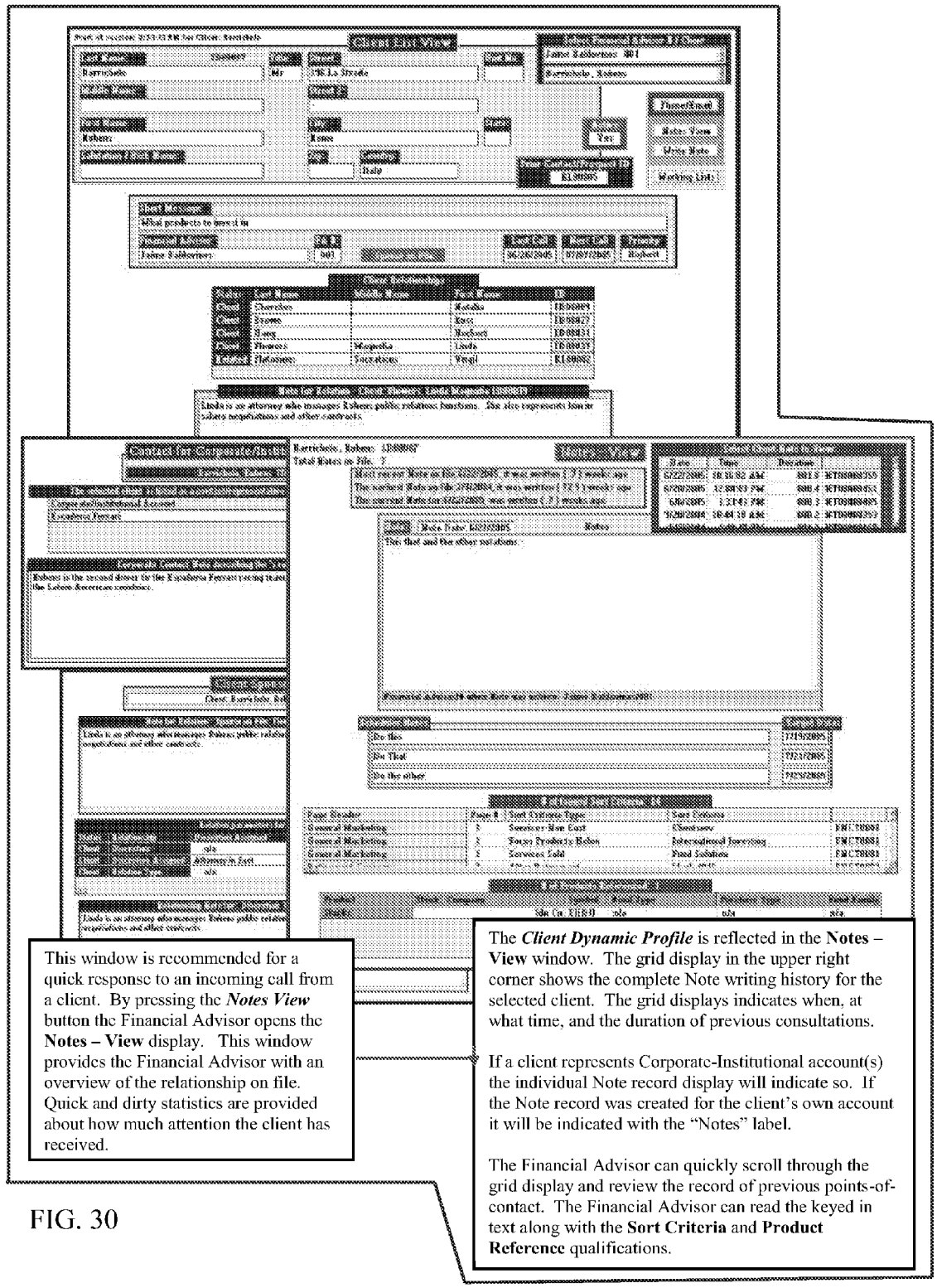
FIG. 30 is a screen view of client list view: notes.

The Note subsystem or Note database presents a new business method allowing a FA to input, centralize, categorize, search, sort and display information FIG. 30 collected from any source. The Note database comprises a flexible data structure containing pre-established tables and user-defined tables. As a FA collects and enters information on an ongoing basis, the Note data base maybe searched or sorted to assist the FA in preparing for client conversations and changing the workflow of the FA.

The FA's reading and writing from the Note database streamlines the FA's workflow, as all of the FA's information is centralized and easily searchable. During conversations with contacts, an FA may enter information or thoughts about contacts or products.

The functions or methods of the invention are more fully described below, and include:
(1) Contact List Function
(2) Note Function
(3) Dynamic Client Profile Sort Criteria Function
(4) Task Scheduler Function
(5) Sort Criteria Manager Function
(6) Market Segmentation Function
(7) Batch Call Session Function
(8) Letter Generator Function
(9) Product Reference Function
(10) Printable Output Function
(11) Multi-Variant Analysis Function
(12) Relations Manager Function
(13) Other functions as shown on the disclosed drawings and described in the specification herein.

Figure 1:
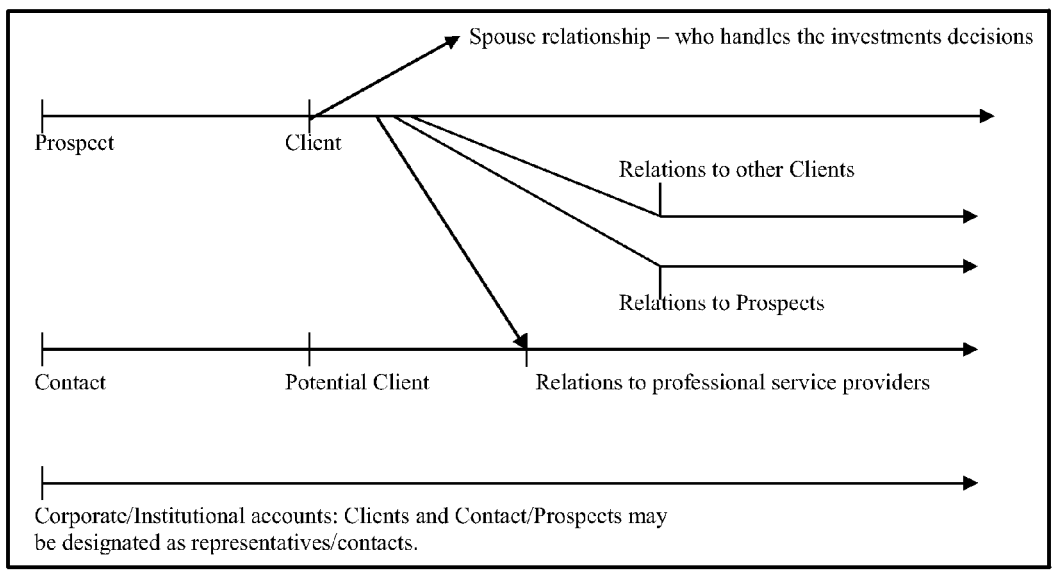
FIG. 1 is a chart of the contact list functions.

The Contact List function is tracks stages of relationships, from Prospects to Clients. As shown in FIG. 1, the Contact List function tracks the stages of relationships that become multi-party (for trust account or related accounts due to family or other relationships).

For contacts who provide professional services to the FA and/or to clients, two conditions appear in a pull-down menu:
(1) Date range—anticipated period in which professional services are anticipated to be in demand; and
(2) Active: yes/no.

This type of contact can be converted to Active Client status with the Relations Manager. Upon conversion the party is automatically rendered inactive (as a Contact/Prospect).

For a contact who is a Prospect, a person who may become a client, two conditions appear in pull-down menus:
(1) Date range—period of time the FA will dedicate towards working toward a client relationship; and
(2) Active: yes/no A prospect can be converted to Active Client status with the Relations Manager. Upon conversion the party is automatically rendered inactive (as a Contact/Prospect).

A Client is a person with an open account with the user or FA. For a client, there is one condition that appears in a pull-down menu:
(1) Active: Yes/No.

Figure 2:
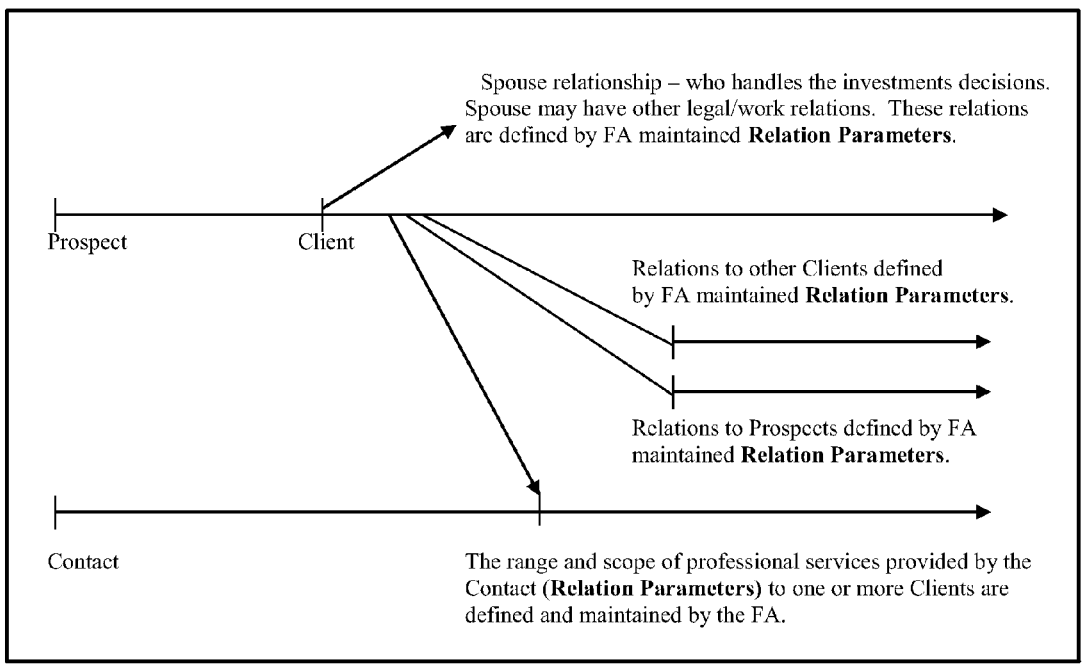
FIG. 2 is a chart demonstrating internal relations between clients, other clients and others.

The contact list function includes the ability to define internal relations between Clients, other Clients and Contact, Prospects as further illustrated in FIG. 2.

As shown in FIG. 2, a spouse relationship may be a spouse who handles the investment decisions. The spouse may have other legal/work relations. These relations are defined by the FA maintained Relation Parameters.

The range and scope of professional services (Relational Parameters) provided by the contact to one or more clients are defined and maintained by the FA.

The contact function allows the following set of relations for a reference Client:
(1) A spouse relationship with another Client (not Contact/Prospects). The spouse relation allows the FA to target mail out-distributions to the spouse that assumes the investment responsibility. The FA can define this parameter with the Relations Manager. This allows the Letter Generator to produce personalized correspondence to the selected spouse.
(2) Defined parameters relationships with other Active Clients, Contacts and Prospects. The Relations Parameters sub-system allows the FA to create and manage Relation type(s), Discretion and Discretion Assigned parameters. The FA has the option of declaring the Relation type(s) and Discretion parameters as Active or Inactive. This will control which Relation type(s) and Discretion will appear in the pull down menus. The Discretion Assigned parameters have a Schedulable: Yes/No condition. If the Yes condition is selected, then the FA has access to the Task Scheduler sub-system. Complex tasks related to, for example trust accounts, can be delegated to assigned personnel. When a task is delegated to assigned personnel a record is added to the list display in the Relations Task Manager window. The FA is informed of tasks to be completed by a certain date in the initial opening window of the application. This tracks assigned tasks to completion with the Relations Task Manager window. Upon completion, the completed tasks are "archived", that is, transferred to the Archived Tasks table, the contents of which are displayed in the Archived Task Scheduler: Assignments window. This window is used to partially review the work performed by assigned personnel.

(3) The FA can set up a set of internal relations to a reference Client to provide, for example, a service definition for trust account that may involve the reference Client, other Clients and Contacts such as accountants and lawyers who may provide some services to contacts or prospects. The Relation Parameters will define the internal relations between the internally related parties.

Figure 3:
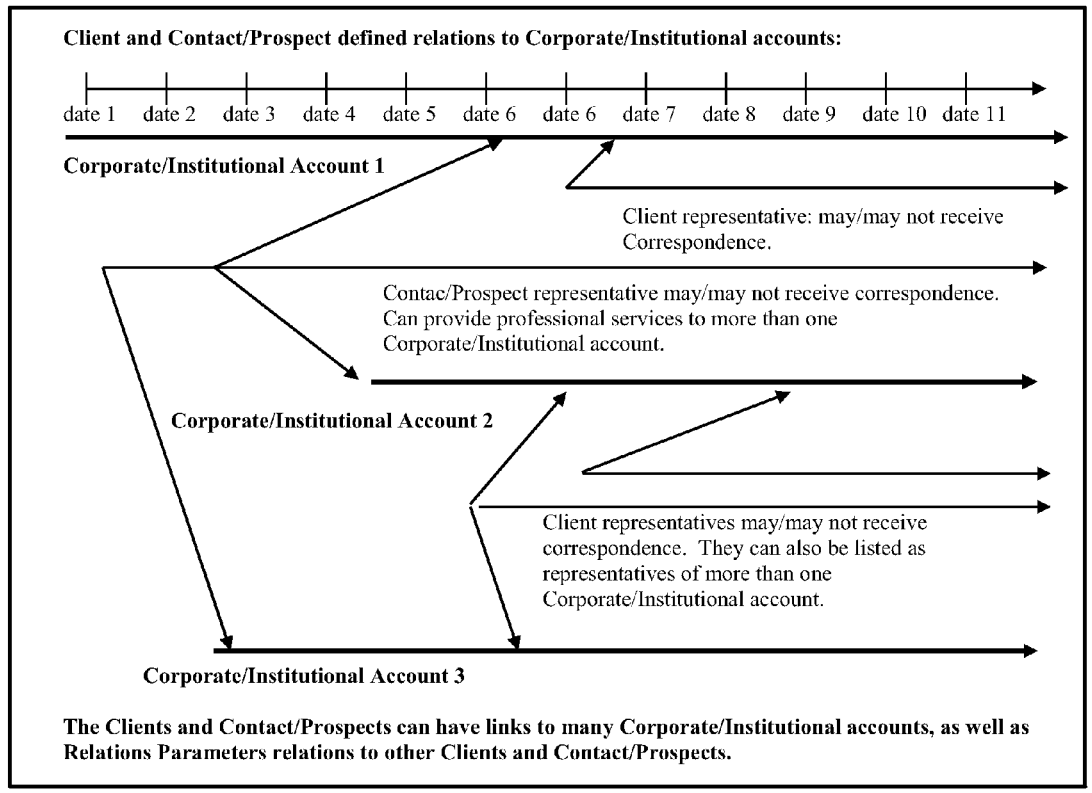
FIG. 3 is a chart of defined relations to corporate/institutional accounts.
Figure 4:
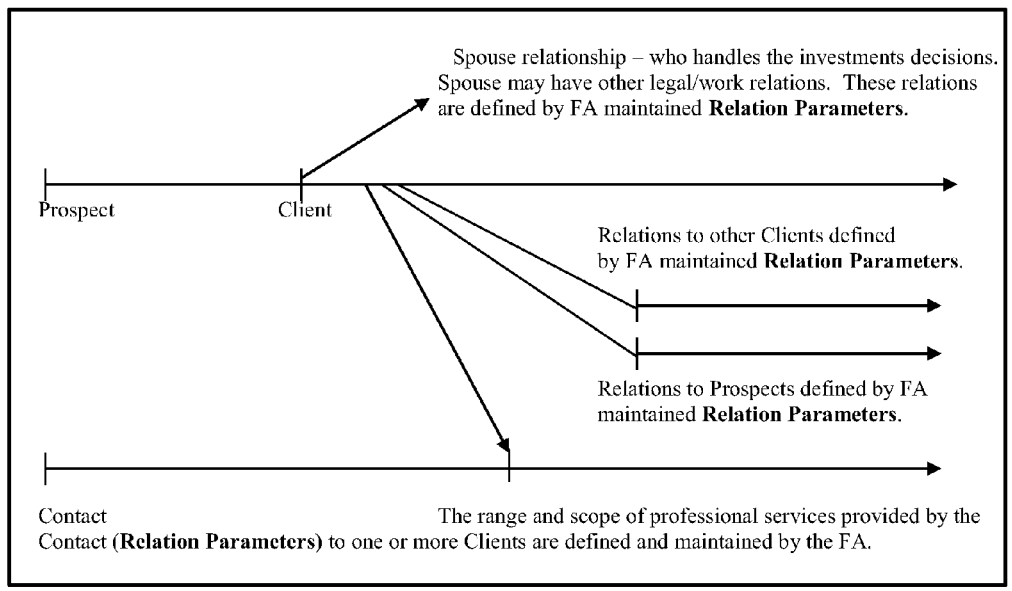
FIG. 4 is a chart of relations parameters.

The contact function allows Active Clients and Contact/Prospects to be linked to Corporate/institutional Accounts as shown in FIG. 3 and FIG. 4.

As shown in FIG. 4, Clients and Contact/Prospects can have links to Corporate/institutional accounts, as well as Relations Parameters relations to other Clients and Contact/Prospects.

The Note and Note Sub-System Functions

Within the Note sub-system functions or Note database, individual Note records, tables or data structures may be created for new or existing clients, active clients and active clients as a contact-representative for other contacts or prospects. For a New Client, a Note record is created. The contents of the record will initiate the Client Dynamic Profile. A New Client Note record is created when a Contact/Prospect is converted to a Client with the Relations Manager.

For an Active Client, Note records can only be created for Active Clients. In the visual display or print out, the FA can select to see New Client Note records, or ongoing Client Note records.

For an Active Client as a contact-representative for an Active Corporate/institutional account, an Active Client may be listed in an unlimited number of Corporate/institutional accounts. Note records are created for the Client and the Corporate/institutional account(s). Note records can be reviewed for the Client, all parties listed under selected Corporate/institutional accounts, and all Note records for the Client (each record is tagged with originating information). The FA may review the Note records that pertain to the Client's own account, and the Note records that pertain to the affairs of one or more Corporate/institutional account(s). All Note records are tagged with the originating application code, i.e., Client, New Client, Contact/Prospect and Corporate/institutional Account.

Each of the major sub-systems or sub-routines of the Note function are sometimes described herein as an Application. The batch Next Call sub-systems are different for the Client and the Contact/Prospect sub-sets.

In some analytical-function displays the FA may view only sub-sets of New Client, Existing Active Client, Contact/Prospects and Corporate/institutional coded Note records. Several displays will give the FA a summary of all Note records for a selected Client or Contact/Prospect. The point of origination is displayed in each record so that the FA can review all Note records on file for a particular contact or related group of contacts.

The FA may also review all the Note records for a Target Client and all the related parties. This allows the FA to track all the Note record notations/deliberations regarding matters such as trust accounts, which may involve a number of Clients, Prospects and Contacts.

For a new Contact/Prospect or active contact/prospect, a new Note record is created. Only Active contacts or prospects will generate a Note record.

Components of the Note Record Data Structure

Note records may be saved with the Client or Contact/Prospect ID to record deliberations pertaining to the selected party. Note records may be saved with a Corporate/institutional account ID and the Client or Contact/Prospect ID to record deliberations of matters pertaining to the Corporate/institutional account(s).

Engage Associative Powers

Engaging the FA's associative powers assists the FA to both better understand the individual client and to perceive or discern constantly changing trends or patterns, which results in significant changes in the Workflow of the FA.

Defined topic-issue Sort Criteria codes are used to perform market niche segmentation. The FA executes selection routines to identify the groups of Clients interested in the various topics. The FA has the ability to identify different groups of Clients and formulated different strategies to best approach each market segment.

The Sort Criteria are codes (encapsulating an issue or concept applicable, or of interest to the Client/Contact-Prospect) that are applied to qualify text entries to the Note field. By selecting all Note records tagged with a selected Sort Criteria the FA may group together a set of Note record text entries for different Clients (or Contact/Prospects). This method is a change in Workflow and allows the FA to engage her associative powers to perceive trends or patterns that would not have been visible or understandable otherwise. The early identification of emerging trends and patterns allows the FA to change her approach to Clients and to provide significantly better service.

Another fundamental change to a FA's Workflow is the application of the Marketing Concept to the daily work routines of a FA. The ideas of Marketing Concept based Corporate Planning methods and techniques applicable to multinational corporations are applied to what is considered someone akin to a franchisee, that is, the FA works under a parent company's logo but is left to her own devices in serving a group of clients.

In time, with use of the invention, most aspects of the FA's Workflow are reconsidered and various functions are merged. For example, prior to the present invention, a FA would generate a hard copy of the Next Call list with Next Call dates for the next day. The FA would then go through each name on the working Next Call list and then transfer the name to one of four or five sheets of paper each with a topical heading. This procedure was performed in preparation for calls to clients and it involved a good deal of time and concentration. This time consuming set of procedures is automated by the present invention.

Figure 26:
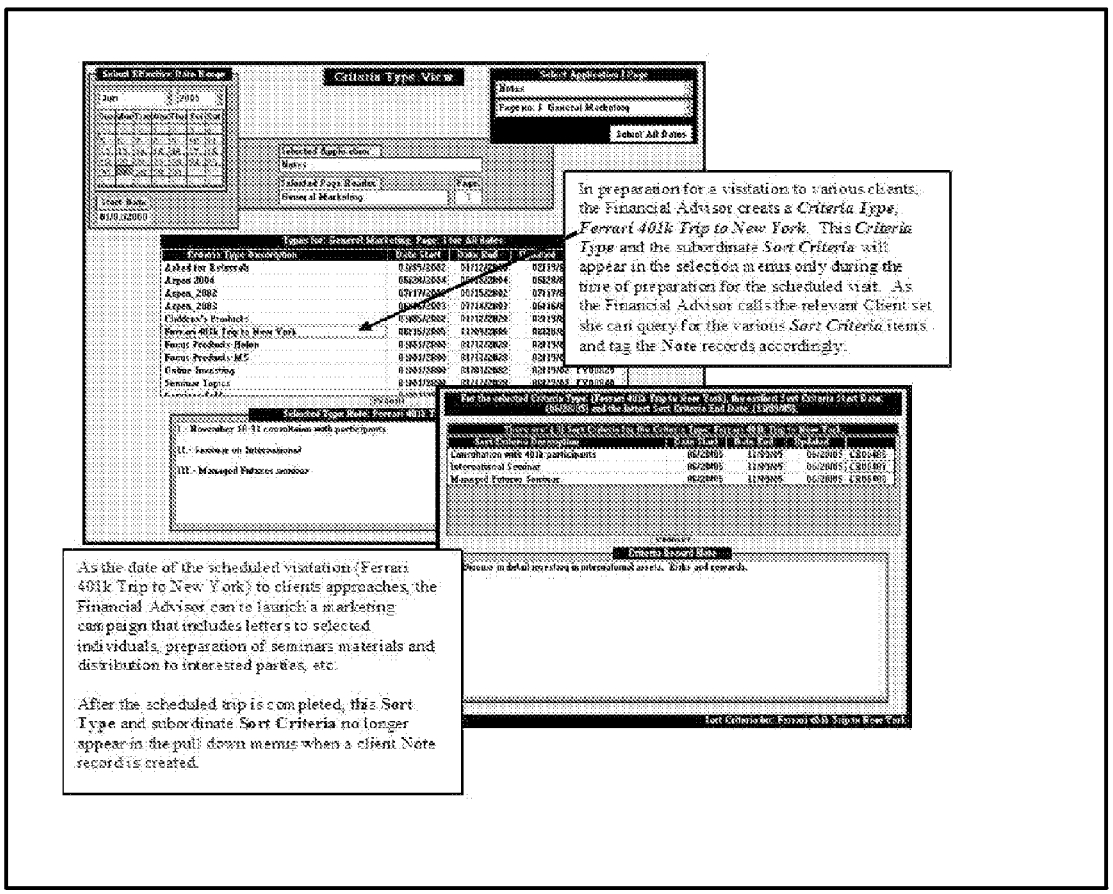
FIG. 26 is a screen view of sort criteria view: general marketing.
Figure 27:
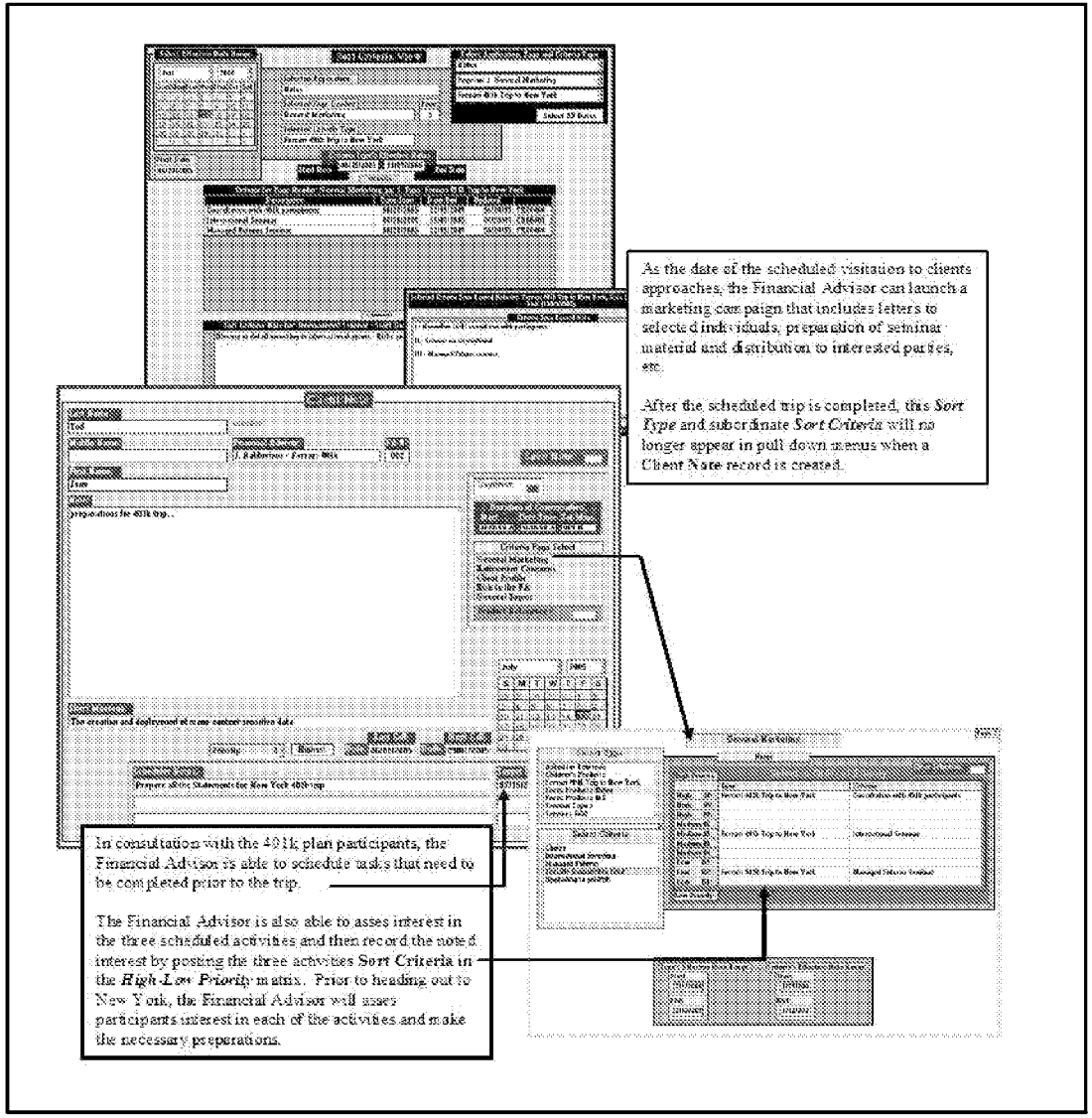
FIG. 27 is a screen view of sort criteria view: group.

When a Client is introduced into the system (the present invention), the client is entered through the New Client Note sub-routine. The New Client sub-routine has a set of Sort Criteria FIG. 26 that apply only to the point of introduction. Instead of having a set of predefined fields as in the corporate client profile, the present invention has means of adding as many Sort Criteria as needed that create parameters for a Dynamic Client (or Contact/Prospect) Profile. FAs all over the country and at different times may use the present invention in a stand alone basis or in a network environment to create Dynamic Client Profile Sort Criteria that will identify unique characteristics of their client base. The ability for each user to create their own Dynamic Client Profile Sort Criteria creates a change in Workflow that is new and unprecedented in contact management systems.

User Defined Internal Relationships Between the Parties

The invention includes sub-systems or functions to track relationships between Clients, Contacts and Prospects. The sub-systems, such as the Relations Manager function, allow the defining of internal relationships between parties and the viewing (in one or several displays) all the Note text records for defined groups of people. This allows the collection of many points of contact textual records (written over long periods of time) of various related parties to asses the group's issues and concerns. After reviewing the group's concerns (as separate from each individual's concerns) a FA may contact the appropriate parties and set deadlines. The setting of tasks and deadlines may be followed and implemented in the integrated sub-systems to delegate tasks to assigned personnel and to track tasks to completion.

Other sub-systems or functions are used to track the issues and concerns of accounts that may have decentralized authority by parties acting as representatives of, or providing professional services to Corporations/Institutions, and other contacts.

Figure 5:
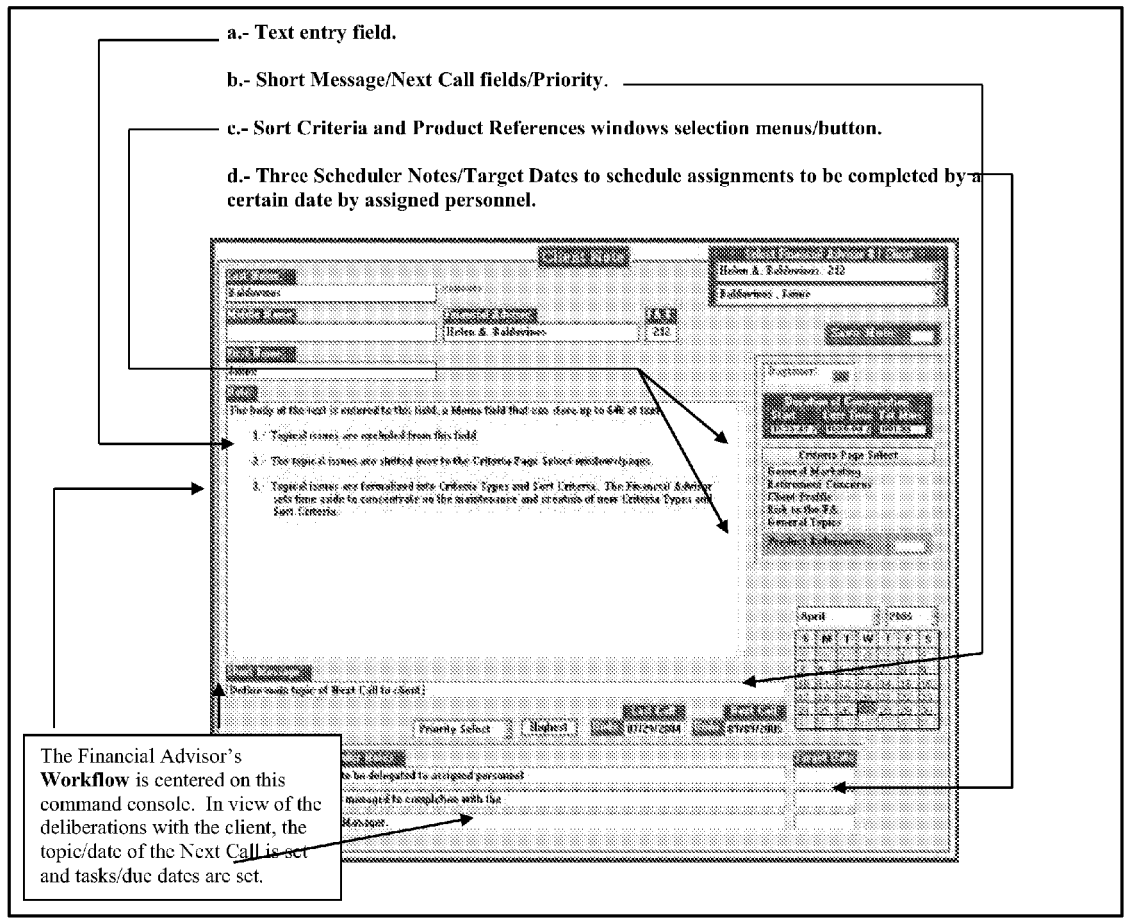
FIG. 5 is a screen view of the note record writing/reading command console.
Figure 6:
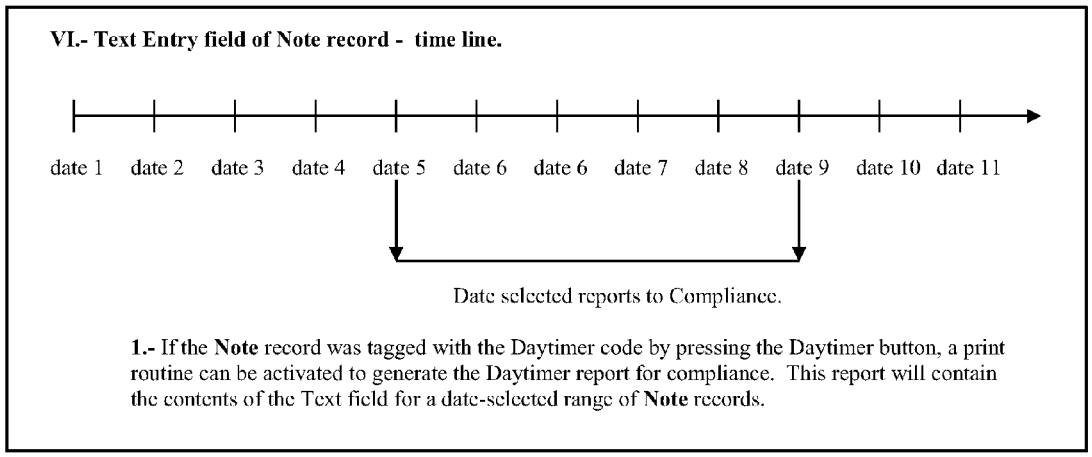
FIG. 6 is a time line for a text entry filed of a Note record.

The Note Record Writing and Reading is Instrumental in Creating Changes to the User's Workflow As shown in FIG. 5, each Note record or data structure has four major components (plus a button to designate if the Note record should appear in the Daytimer reports generated for SEC compliance). While in consultation with a contact, the FA may record the pertinent points of the conversation, qualify the textual entries with Sort Criteria and Product References, define a topic for the Next Call, set a date for the Next Call and schedule one or more tasks to be delegated to assigned personnel. Timelines as shown in FIG. 6 may also be generated.

The application of Sort Criteria and Product References is an integrated marketing intelligence gathering function that may be used for many purposes including market niche segmentation and the construction of Dynamic Client (Contact/Prospect) Profiles.

The Note Writing Method Includes Central Work Station and Intelligence Gathering Functions that Create a New Workflow for the FA The Note writing window as shown in FIG. 5 functions as a central station for the FA. Workflow change is focused on the Note writing window.

The disclosed method of entering information facilitates the creation of data that is machine readable and useful to the retrieval and presentation of data in a context sensitive format. In the preferred embodiment, the text field, FIG. 5, should contain only unique information particular to the Client or Contact/Prospect. In the preferred method, all references to topical issues that may pertain to various segments of the Client or Contact/Prospect base should not be included in the body of the keyed-in text. The FA (or the investment house) creates and maintains Criteria Types and Sort Criteria. The use of the Sort Criteria Manager function allows the FA to pre-visualize or pre-conceptualize issues and concerns that will reflect expressed interests and concerns of the Client and Contact/Prospect base. The FA is provided with a formalized and controllable system to capture issues and then to relate these issues to the text entries in the Note record. Sort Criteria then are used as qualifiers for textual entries. The immediate benefit is that the FA may select all the keyed-in textual entries that were tagged with one or more Sort Criteria. The FA may then use her/his associative powers to read the selected set of textual entries and immediately discern issues and concerns that may be of interest to a group of Clients or Contact/Prospects.

Because of the disclosed method of entering information and use of the invention, the FA's Workflow is fundamentally changed. By dedicating blocks of time (late in the day or during a long wait as in spending hours in transit) the FA may prepare Sort Criteria to tag textual keyed-in entries.

The FA's preparation time is rationalized. Instead of spending inordinate amounts of time reviewing Clients' (or Contact/Prospects') notations, searching for relevant points and developing trends with no other tool than concentration or memory, she will spend low quality time creating and managing Sort Types and Sort Criteria.

The application of the Sort Criteria to Note record textual entries reduces the amount of time the FA needs to spend reviewing cryptic textual entries. In one of the Note record view displays FIG. 9H the display is used to provide the FA with a quick summary of all Note records for a selected Client or Contact/Prospect, and the selected party's entire relationship history may be reviewed. Since the text entries are presented separate from the Sort Criteria and Product References, the FA is able to quickly gain a sense of the documented relationship with the contact. This method or process is referred to as a Dynamic Client Profile (or Dynamic Contact/Prospect Profile).

The application of Sort Criteria and Product References to qualify entries made to the text field of a Note record also provides the FA with the ability to perform functions that were previously performed with spreadsheets (if performed at all). Specifically, the FA may use the invention to initiate a marketing campaign by creating one or more Sort Criteria for a topic that may be of interest to many contacts. As the FA calls Clients and Contact/Prospects she/he can assess interest in the Sort Criteria topic/marketing campaign code.

Figure 12:
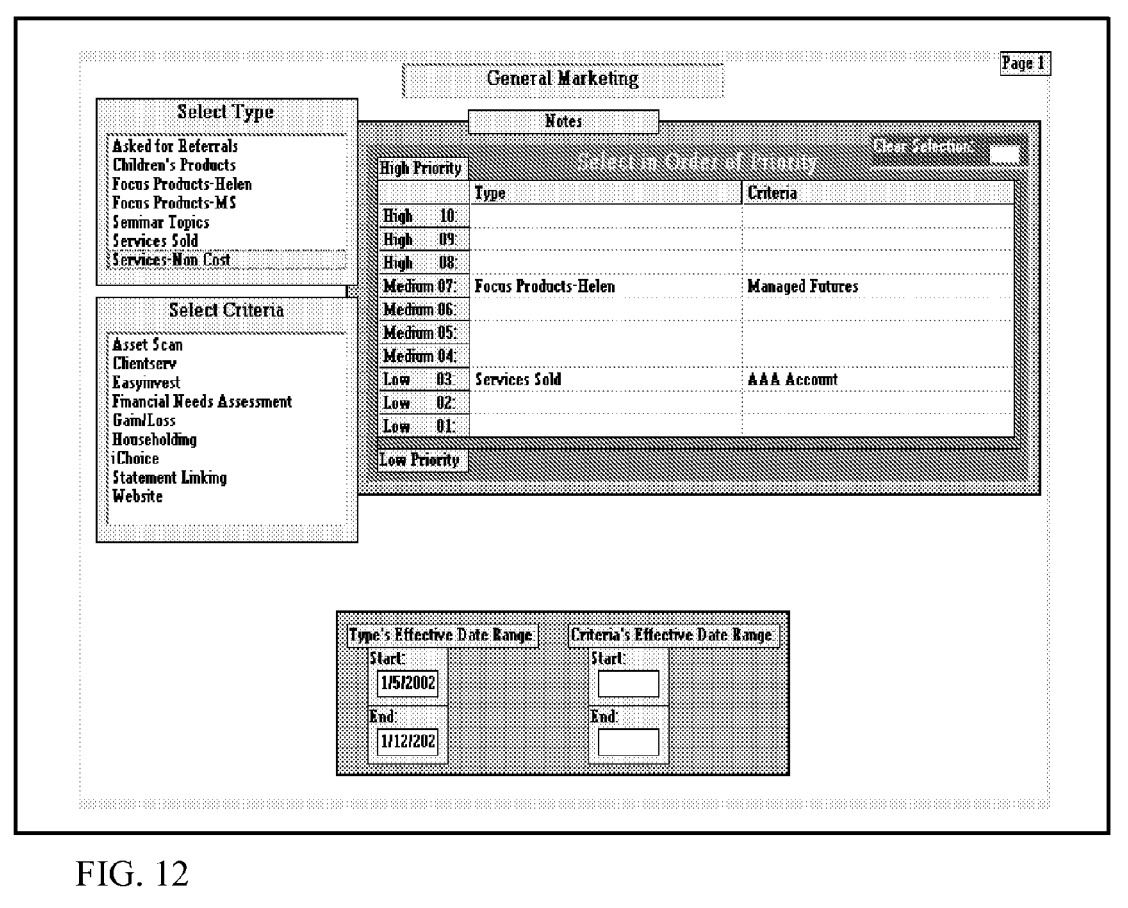
Figure 28:
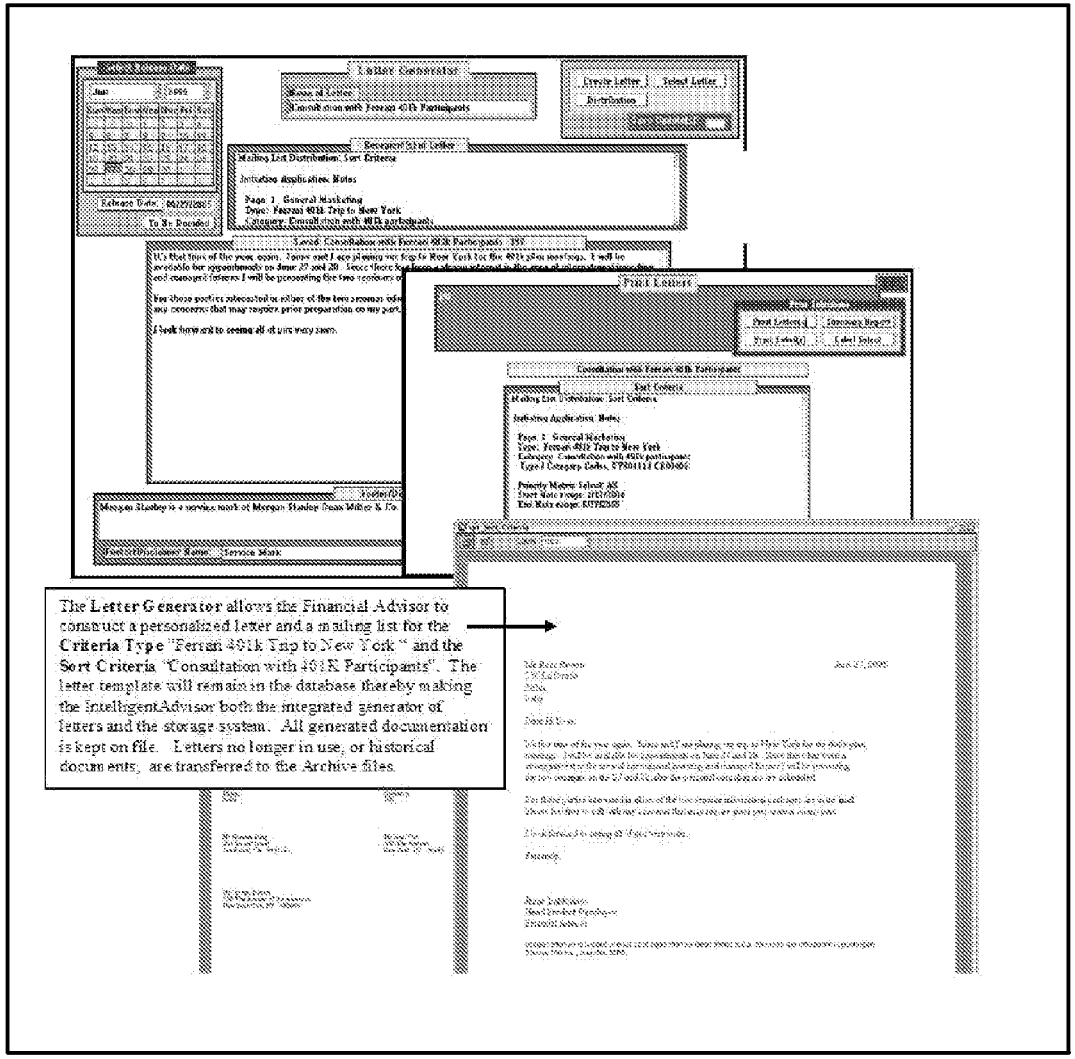
FIG. 28 is a screen view of the letter generator.

As shown in FIG. 12 the FA places Sort Criteria codes on High-Low Priority matrices, allowing the Letter Writer Manager to select those Clients or Contact/Prospects for whom the marketing campaign Sort Criteria were placed in the high interest categories. This method enables the FA to perform the market segmentation function by first creating a topical Sort Criteria, then while conversing with Clients (or Contact/Prospects) tagging Note records with the Sort Criteria code if interest is indicated. Subsequently the FA may create a letter and a distribution list to reach the selected set of contacts. Personalized letter and addressed letters/mailing labels may be generated by the Letter Generator as shown in FIG. 28.

The Workflow changes of a FA created by the invention are part of a larger design that includes the application of the Marketing Concept to the business affairs of an independent FA. The Marketing Concept is a method of large-scale business enterprise administration. The Marketing Concept is applied by basing all major business decisions on documented changes or perceived trends of the client base. The invention provides the independent FA with a method to perform marketing research on the fly, to use the marketing information to launch marketing campaigns, and to continuously re-focus personal/institutional resources for providing superior service to identified market niches.

Daily Operations

Figure 17:
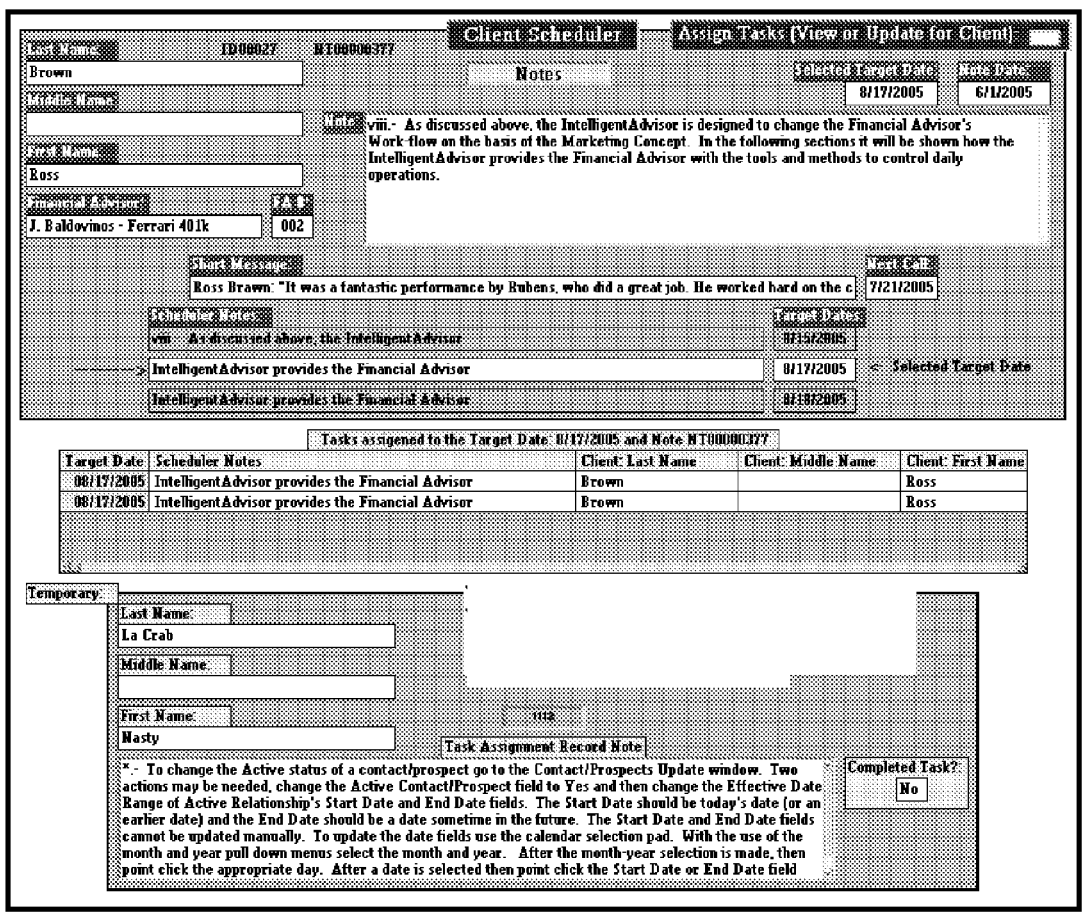
FIG. 17 is a screen view of client scheduler.
Figure 18:
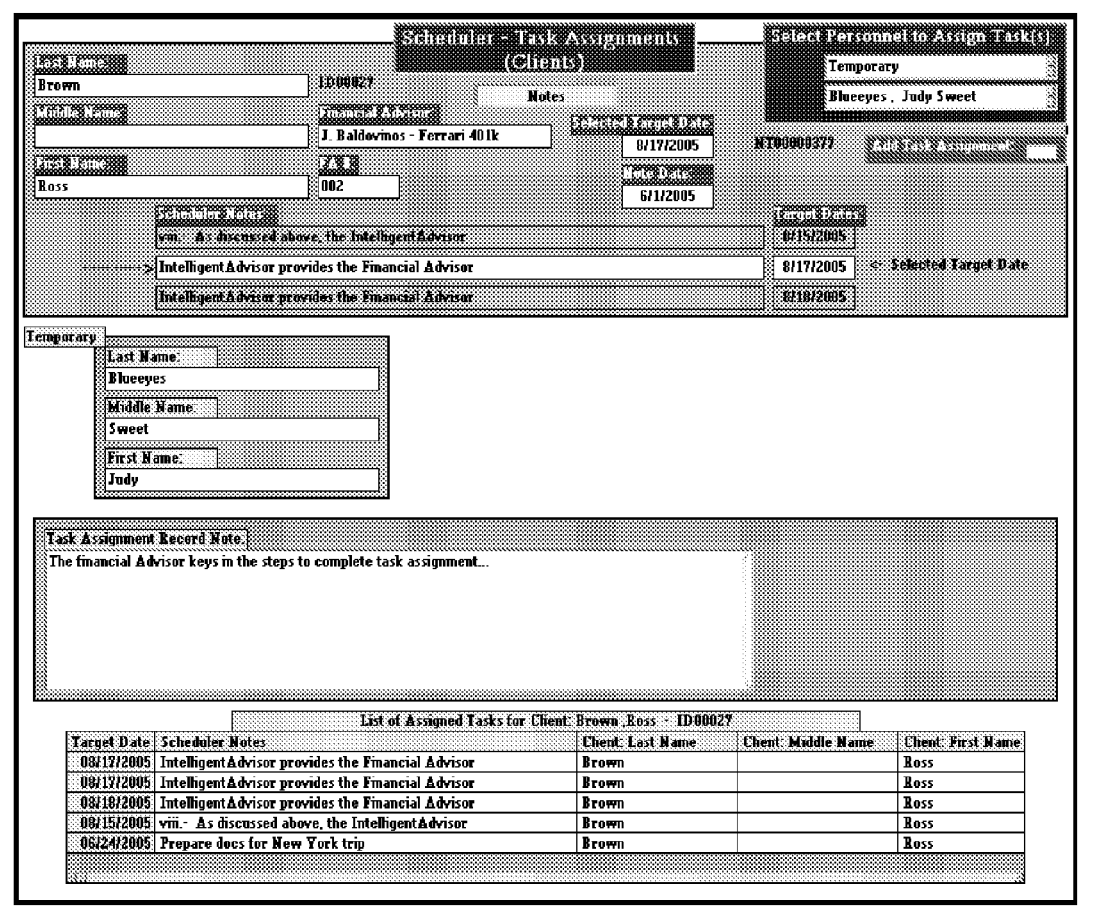
Figure 19:
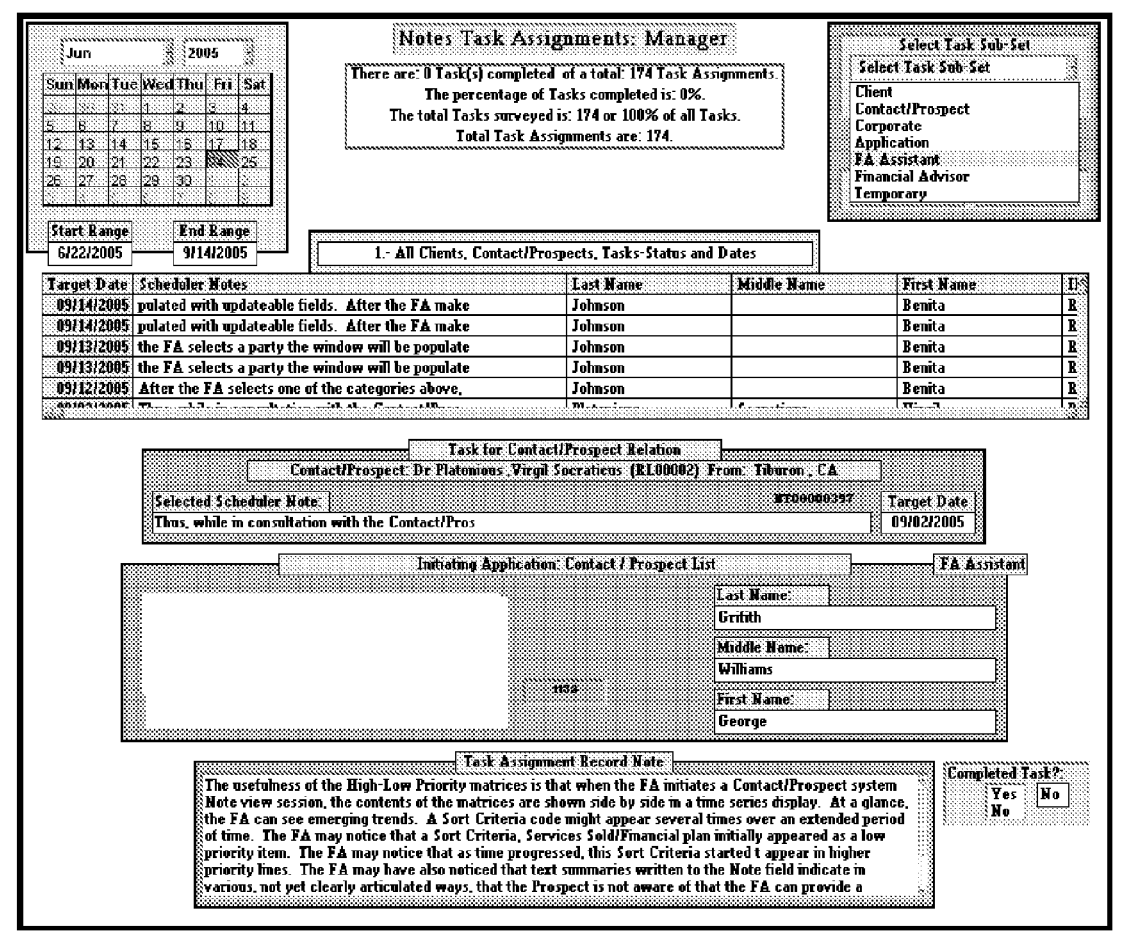

The control of daily operations is performed by task creation and assignment to the FA or assigned personnel such as FA assistant(s). Once the tasks are delegated to assigned personnel, the FA will use the Notes Task Assignments: Manager, FIG. 19, to track assigned tasks to completion. The Next Call to Clients (and Contact/Prospects) function is automated. Schedules are also generated FIGS. 16, 17, and 18.

SEC Compliance—Time Line

The invention allows the FA to view sets of Note records for selected contacts and for selected date ranges, which is helpful for compliance with various SEC regulations and various federal regulations.

When a Note record is tagged with the Daytimer code by pressing the Daytimer button, a print routine can be activated to generate the Daytimer report for SEC compliance. This report will contain the contents of the Text field for a date-selected range of Note records.

Next Call Lists

While entering data during contact with contacts, the FA may enter a topic for the Next Call with the contact and set a Next Call date, as shown in FIG. 5. These entries are made to the Master Client or Contact/Prospect lists.

Figure 7:
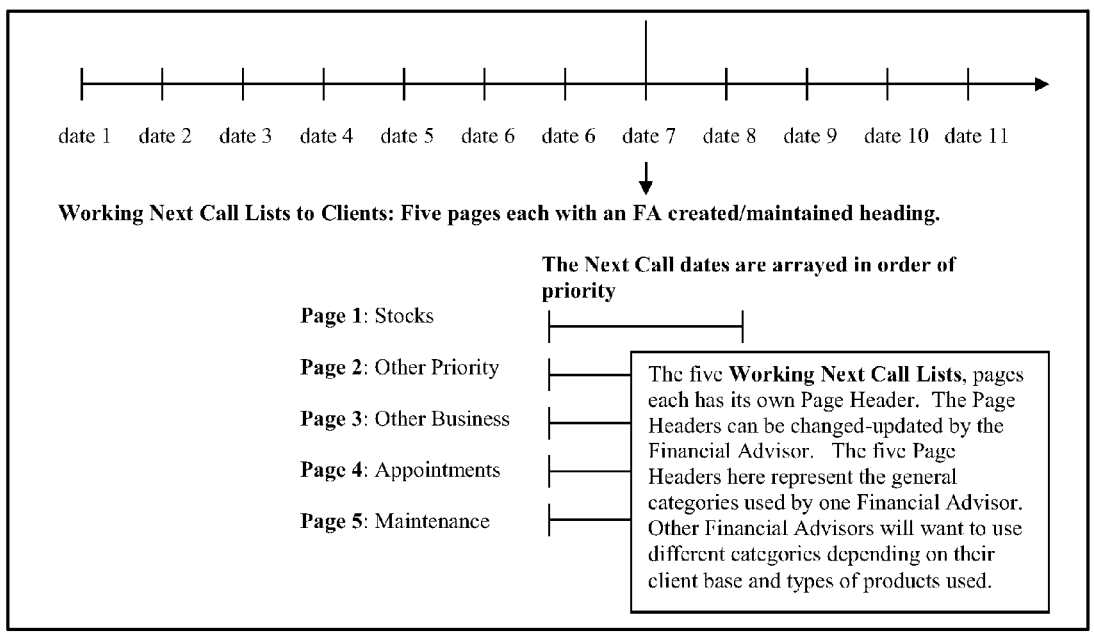
FIG. 7 is a diagram of the master next call list: clients.
Figure 8:
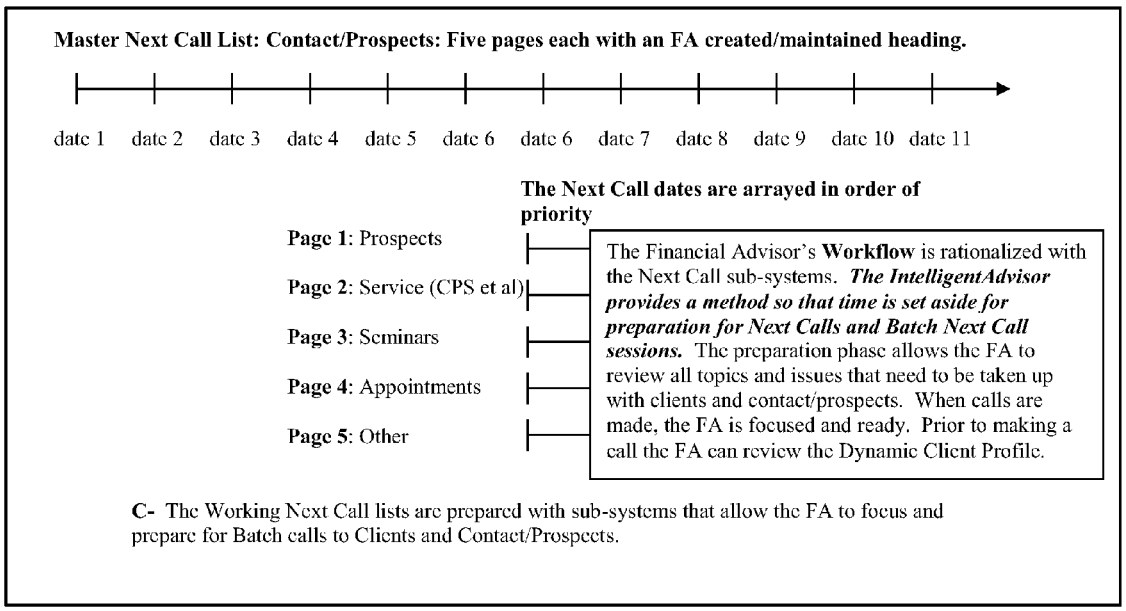
FIG. 8 is a diagram of the master next call list: contact/prospects.
Figure 9:
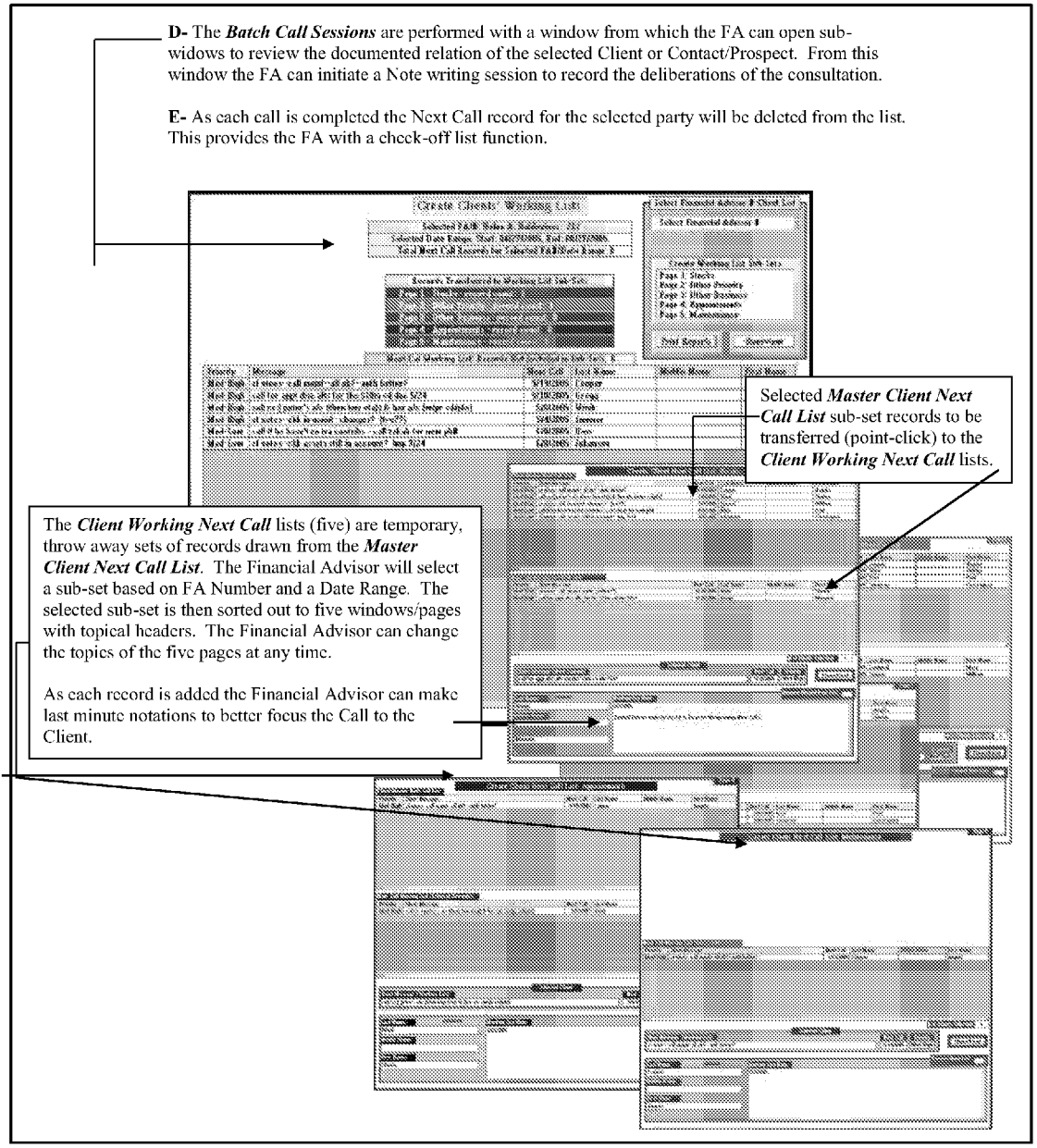
FIG. 9 is a group screen view of the create clients' working lists window and related console windows.
Figure 9A:
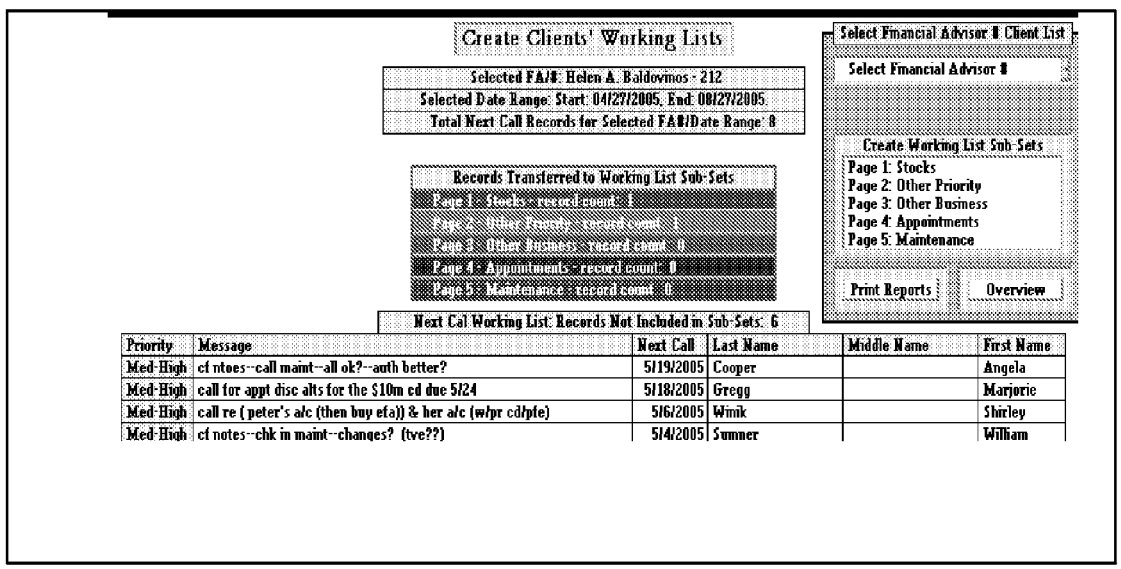
FIG. 9A is an isolated screen view of the create clients' working lists console.
Figure 9B:
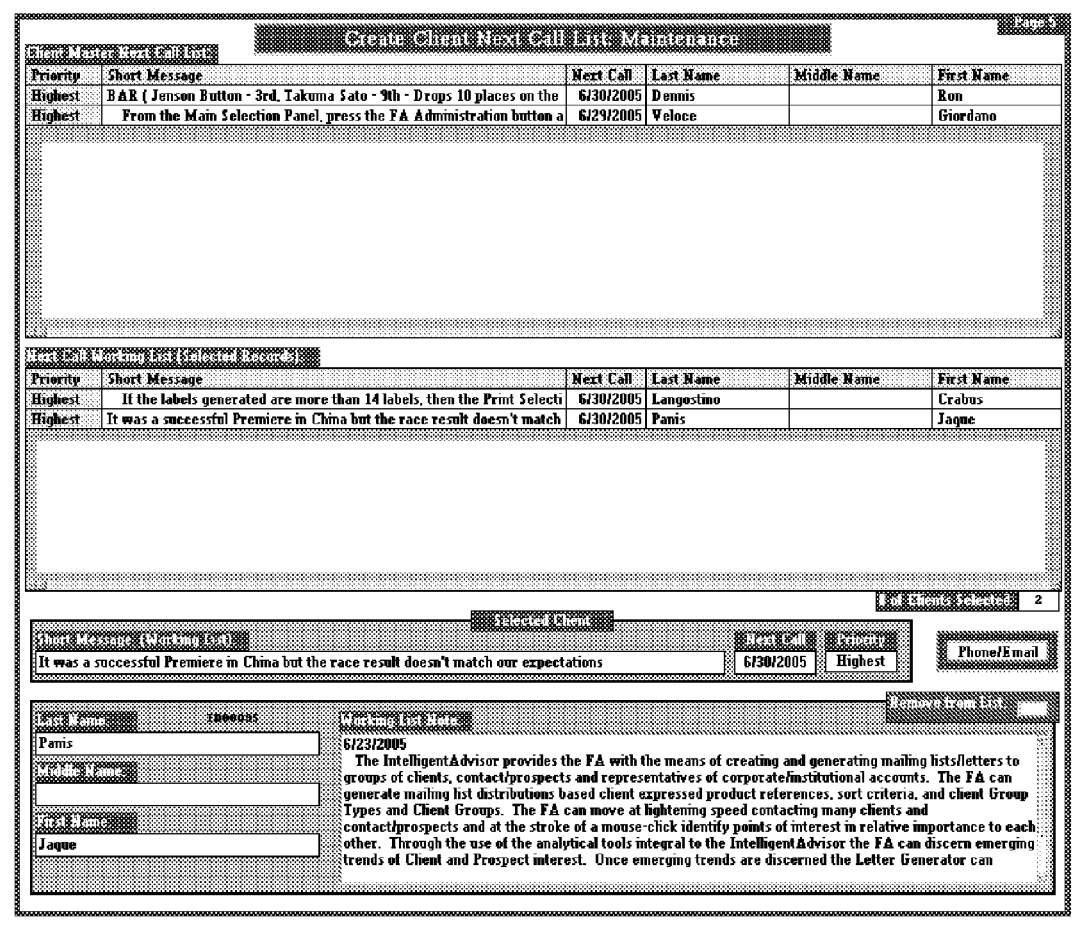
Figure 9C:
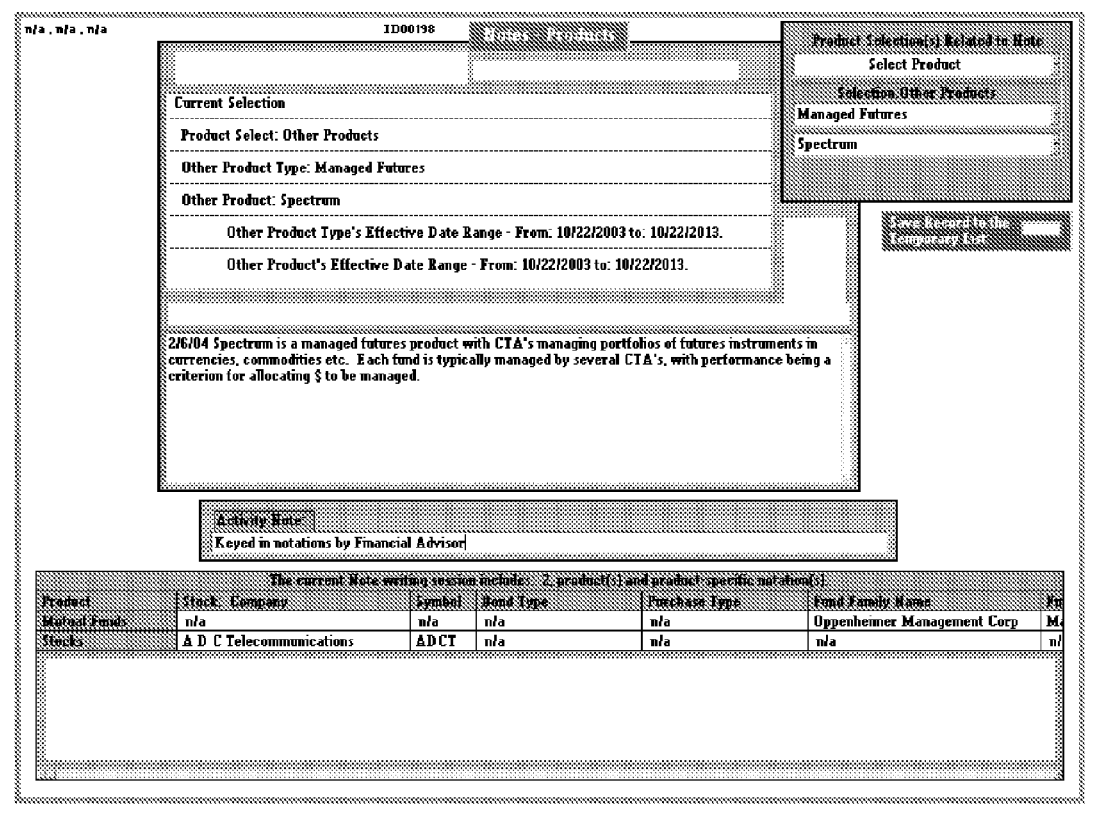
Figure 9D:
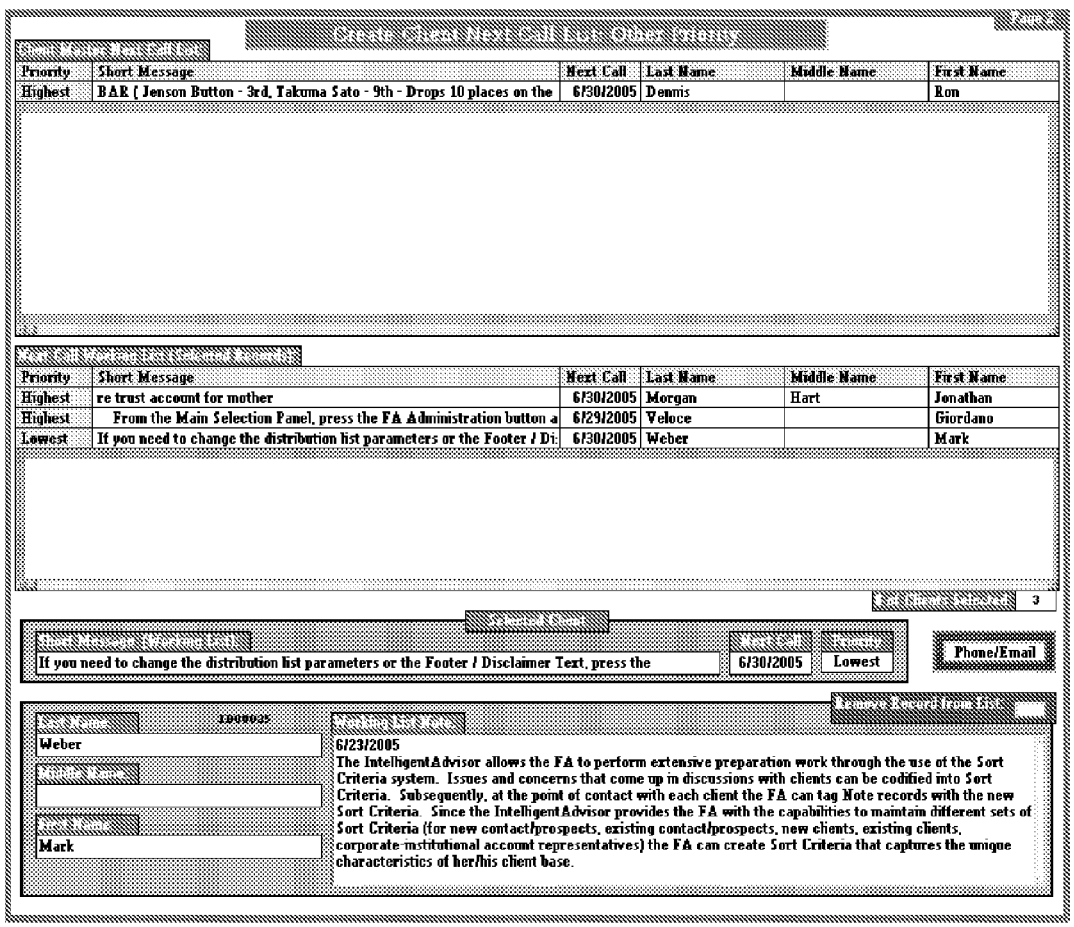
FIG. 9D is an isolated screen view of create client next call list: other priority.
Figure 9E:
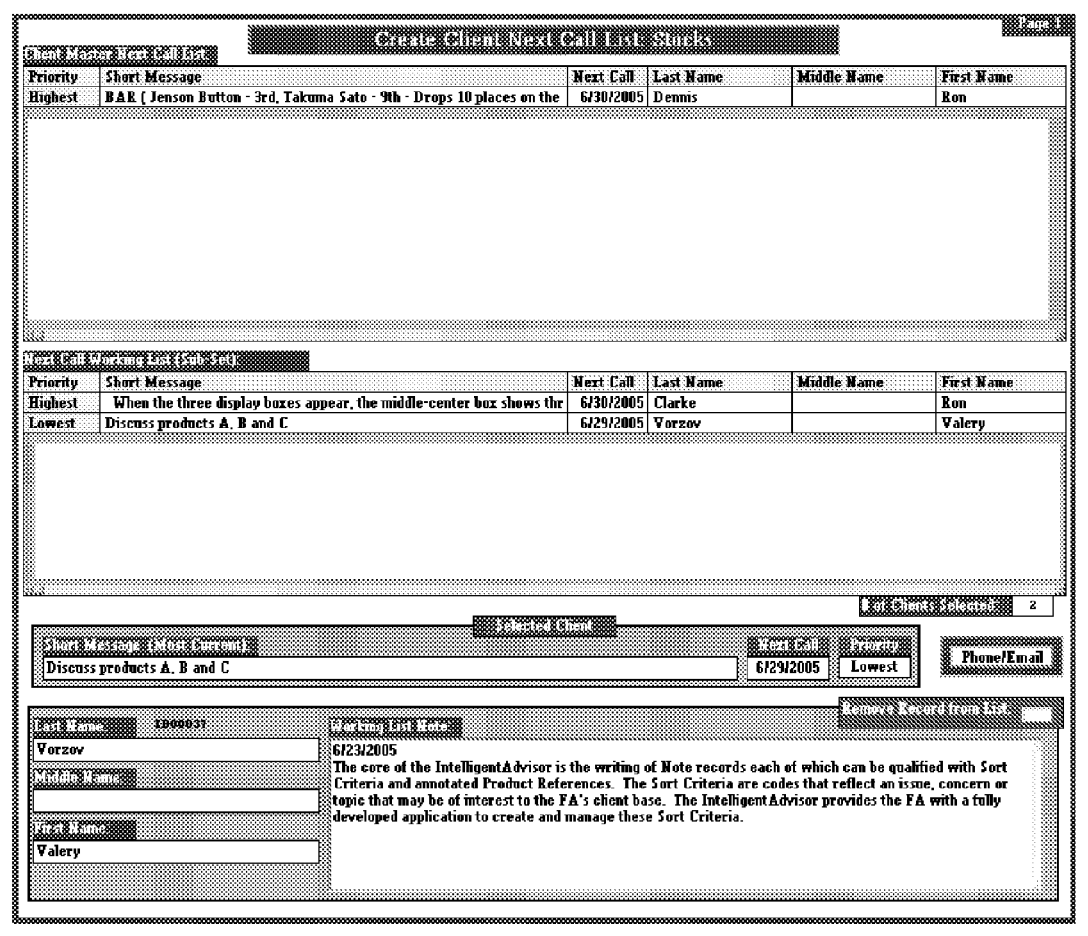
Figure 9F:
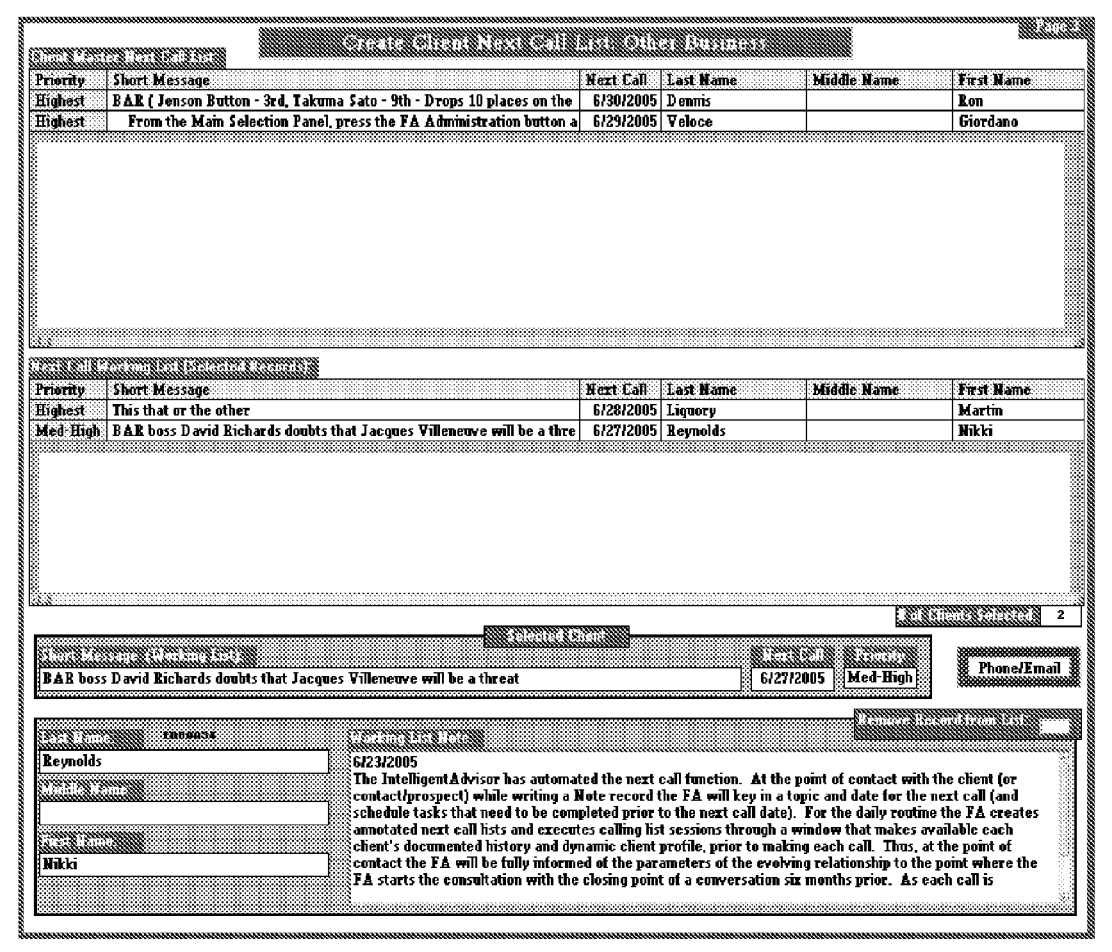
Figure 9G:
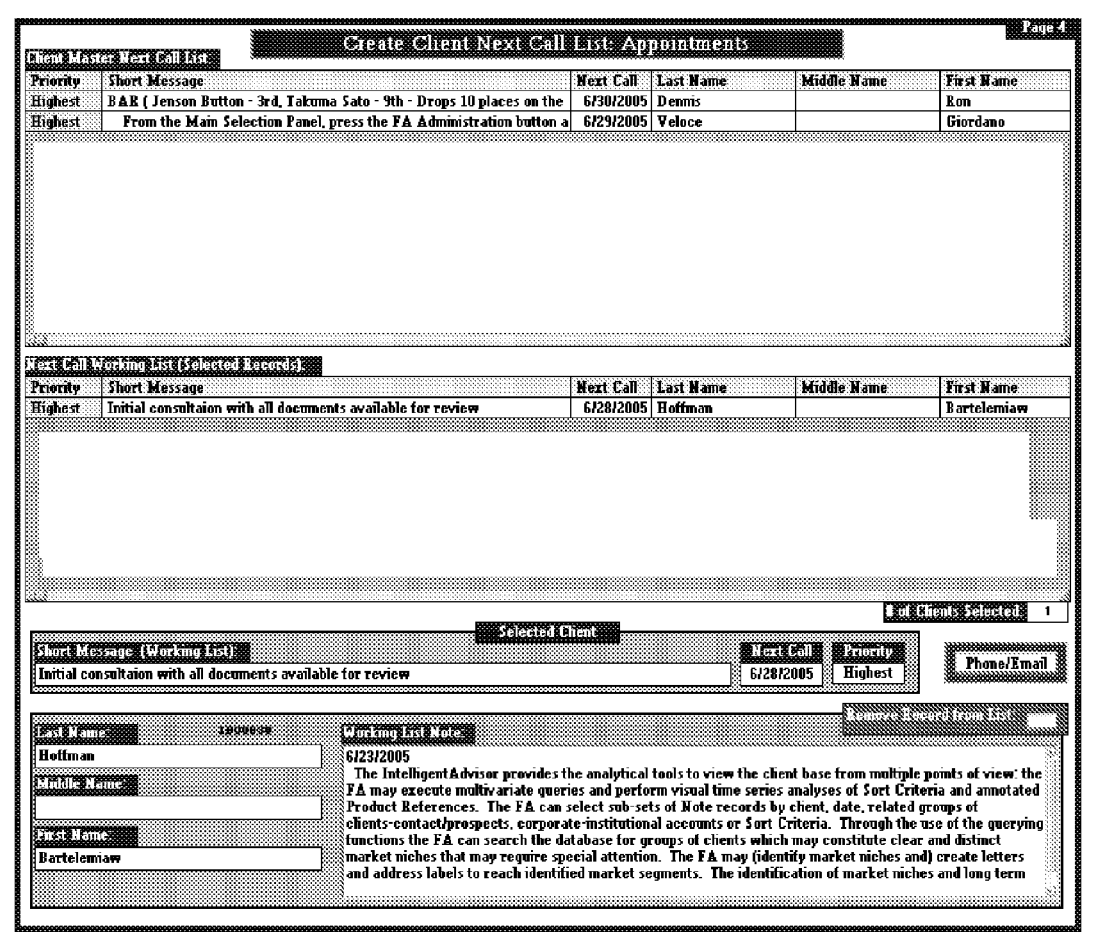
Figure 10:
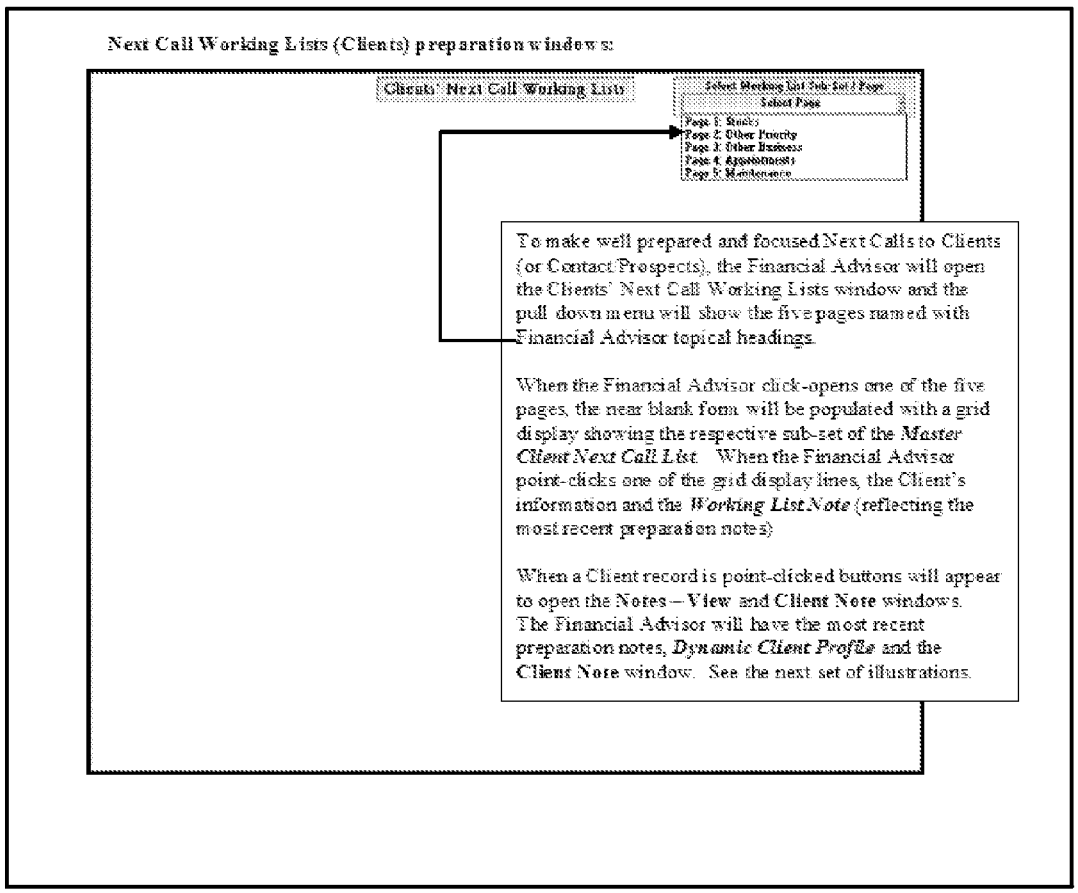
FIG. 10 is a screen view of the clients' next call working list window.
Figure 20:
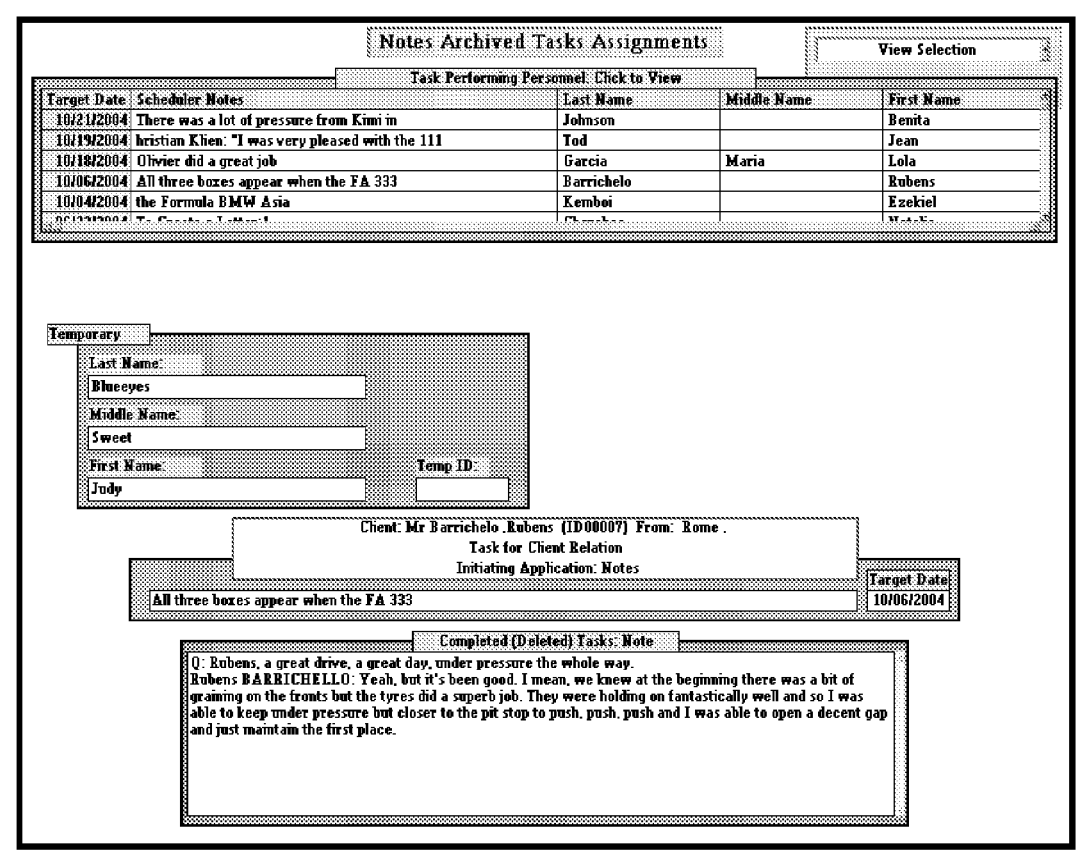

In preparation to make batch calls to Clients or Contact/Prospects the FA may use the sub-systems designed to create Working Next Call lists, FIG. 9, for Clients or Contact/Prospects. Batch calls to Clients or Contact/Prospects are dedicated calling sessions where a FA makes a series of calls for a set of Next Call dates. The FA may sort out the Master Next Call, FIG. 8, records to one of five temporary sub lists, FIG. 7, each list with an FA created page heading (one set of five pages for Clients and another for Contact/Prospects). As the FA uses the Clients' Next Call Working Lists, FIG. 10, (or the Contact/Prospects' Next Working Lists) window and completes the calls to be made, the respective record in the temporary working lists is deleted. When all temporary list records are deleted the FA has completed calls. Completed tasks are archived FIG. 20.

The Next Call Working Lists (Clients) preparation windows are shown in FIGS. 9, 9A, 9B, 9C, 9D, 9E, 9F, 9G, and 9H.

The Next Call dates are arranged in order of priority. The Working Next Call lists are prepared with sub-systems that allow the FA to focus and prepare for Batch calls. The Batch Call Sessions are performed with a window from which the FA can open sub-widows to review the documented information of the selected contact. From this window the FA can initiate a Note writing session to record the deliberations of the consultation. As each call is completed the Next Call record for the selected party will be deleted from the list. This provides the FA with a check-off list function.

The Sort Criteria and Product References windows are the heart of the Intelligence Function of the invention. The Intelligence Function results in a significant change in FA workflow. The term Sort Criteria is used both for the plural and single instance so as not to confuse the user. The terms Sort Criteria and Sort Criterion are used interchangeably for the sake of simplicity.

Figures 13, 14:
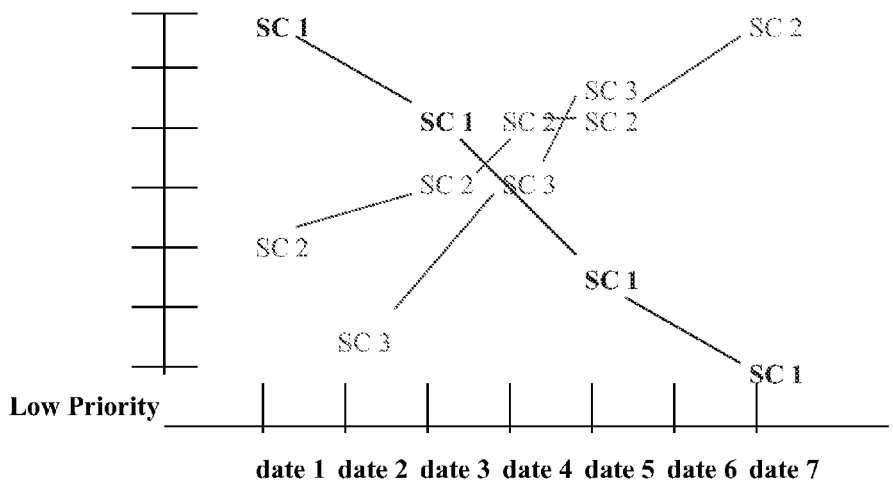
FIG. 13 is a screen view of High/Low Priority by time grid.
FIG. 14 is a screen view of user created High-Low Priority Matrix.

The placement of Sort Criteria in High-Low Priority in relation to one-another, FIG. 13, as qualifiers to each Note record keyed-in text entries allows the perceive trends as they are developing. These trends may reflect the individual Client or Contact/Prospect changing interests and concerns. They may also indicate larger changes in the entire Client or Contact/Prospect base.

There is a sub-system that provides the FA with methods of reviewing Note records for all Clients or Contact/Prospects. One of the methods is the Multi-Variant procedure of selecting a number of Sort Criteria and Product References as selection variable to select the set of records that were tagged with the selection variables. When a Multi-Variant query is executed, the FA can view all the Note record text entries that were tagged with the Sort Criteria and Product References.

The application of Sort Criteria and Product References as qualifiers to textually made entries and subsequent review of the data for the purpose of reviewing the individual relationship with Clients or Contact Prospects results in a fundamental modification of the FA's workflow and procedures.

As the FA keys in subjective issues into the text field, tags High-Low Priority with Sort Criteria, makes annotated Product References, she may initiate operational procedures that may involve a number of personnel. The process of creating a Note record involves the initiation of operational procedures. Tasks topics are keyed in to Scheduler Notes fields; each field is tagged with a Target Date when the task should be completed. After the Note writing session is completed, the FA may go to the task scheduler windows and delegate the task to assigned personnel. The FA may then go to the Notes Tasks Assignments: Manager FIG. 19 window to monitor the progress of assigned tasks. This window allows the FA to generate hardcopy output that is given to the FA assistant for completion. Upon completion of the assigned tasks, the task records are transferred to a task archive table FIG. 20. The FA may use the task archive table for performance review of assigned personnel.

The Note System Allows the FA to Create Dynamic Client Profiles and Dynamic Contact/Prospect Profiles The Client Profile sub-routine collects and displays profile variables, such as income and investment preferences, that may be useful for the investment house to gain an overall view of the client base. As the FA creates Note records qualified by Sort Criteria and Product References another type of Client or Contact/Prospect profile begins to emerge. Profiles are augmented by the additions of each Note record.

Figure 29:
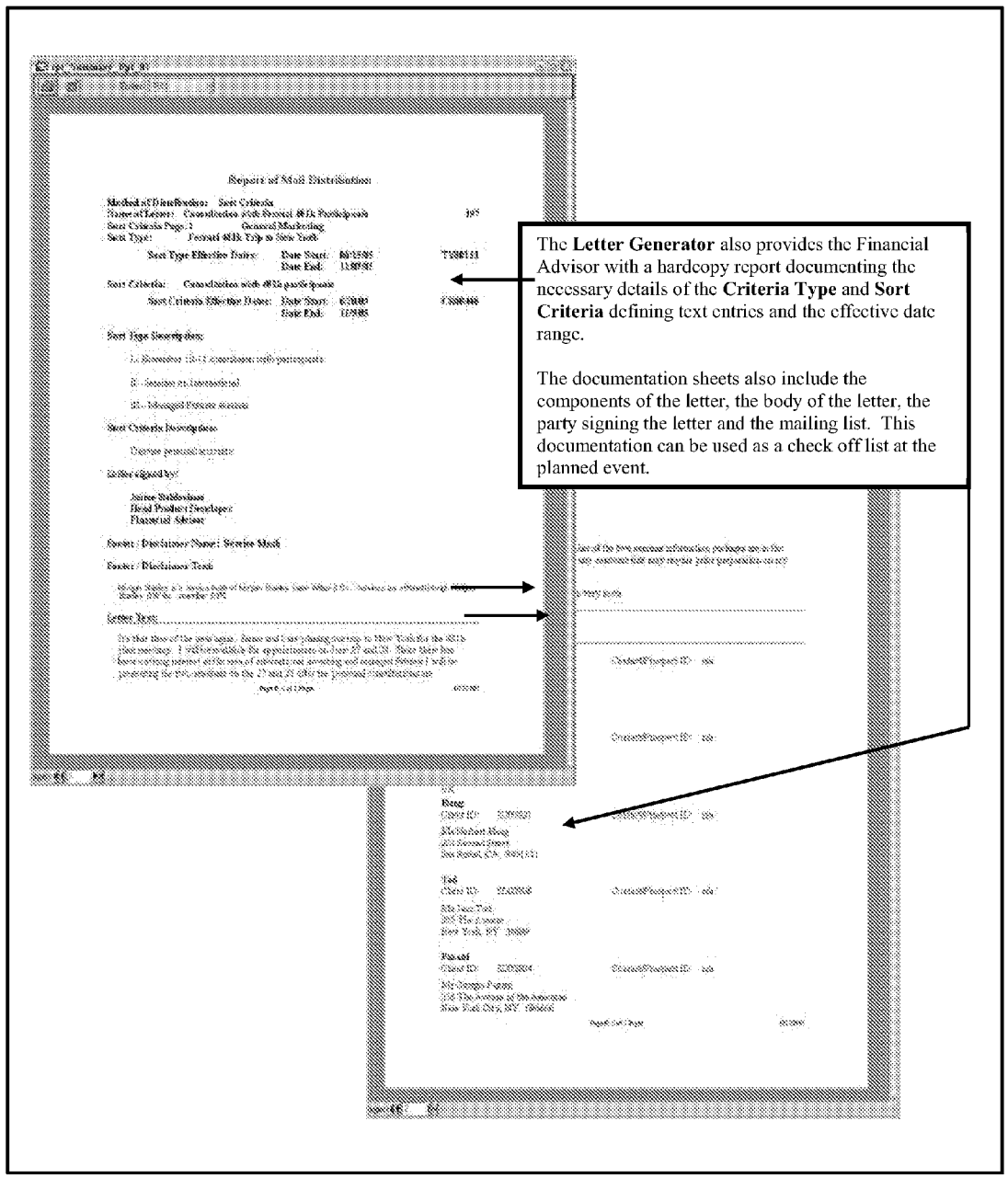
FIG. 29 is a screen view of report of mail distribution.

The Sort Criteria system is extremely flexible. Different Sort Criteria are applied to the separate sub-systems that track different parties: New Client, Active Client, Active Contact/Prospect and Corporate/Institutional. Each one of these party types has dedicated Note record writing sub-systems each with five High-Low Priority Matrices/pages. Each one of the five pages for each sub-system has its own Page Letter Writer sub-system, create a letter template and select all the Clients that showed medium to high interest in the Sort Criteria topic. A mailing list FIG. 29 may be created and a set of personalized and addressed letters may be created.

What is claimed is:

1. A computer readable storage device for facilitating a financial advisor for selecting contacts to approach for investment purposes, the device comprising:

means for collecting contact information of prospective purchasers of investment products;

means for searching contact information by financial advisor defined criteria, wherein a financial advisor is a person engaged in giving financial advice and financial advisor defined criteria comprises a financial advisor's selection of categories of contact information;

means to view trends in contact information by financial advisor defined criteria, wherein a trend comprises a report of changes in values of categories of contact information selected by a financial advisor;

means to manage workflow of a financial advisor based upon financial advisor defined criteria;

means to generate call lists directed toward a financial advisor who is attempting to sell investment products, wherein a call list comprises a list of current and potential clients of the financial advisor;

means to allow a financial advisor to designate delegated tasks, wherein delegated tasks comprise tasks to be completed by a person working at the direction of a financial advisor;

means to allow a financial advisor to assess the performance of those assigned to perform the delegated tasks;

means to add contact information and means to add sort criteria to contact information;

means to allow a financial advisor to test a hypothesis regarding attributes of collected information, wherein a hypothesis is a predicted trend;

means to conduct investment product compatibility analysis wherein investment product attributes are compared with contact information of prospective purchasers of investment products; and means to create mailing lists based upon the results of the financial advisor's hypothesis test.

2. A system for facilitating a financial advisor for selecting contacts to approach for investment purposes, the system comprising a processor with:

means for collecting contact information of prospective purchasers of investment products;

means for searching contact information by financial advisor defined criteria, wherein a financial advisor is a person engaged in giving financial advice and financial advisor defined criteria comprises a financial advisor's selection of categories of contact information;

means to view trends in contact information by financial advisor defined criteria, wherein a trend comprises a report of changes in values of categories of contact information selected by a financial advisor;

means to manage workflow of a financial advisor based upon financial advisor defined criteria;

means to generate call lists directed toward a financial advisor who is attempting to sell investment products, wherein a call list comprises a list of current and potential clients of the financial advisor;

means to allow a financial advisor to designate delegated tasks, wherein delegated tasks comprise tasks to be completed by a person working at the direction of a financial advisor;

means to allow a financial advisor to assess the performance of those assigned to perform the delegated tasks;

means to add contact information and means to add sort criteria to contact information;

means to allow a financial advisor to test a hypothesis regarding attributes of collected information, wherein a hypothesis is a predicted trend;

means to conduct investment product compatibility analysis wherein investment product attributes are compared with contact information of prospective purchasers of investment products; and means to create mailing lists based upon the results of the financial advisor's hypothesis test.

3. A computer implemented method for facilitating a financial advisor for selecting contacts to approach for investment purposes, the method using a computer for: collecting contact information of prospective purchasers of investment products;

searching contact information by financial advisor defined criteria, wherein a financial advisor is a person engaged in giving financial advice and financial advisor defined criteria comprises a financial advisor's selection of categories of contact information;

viewing trends in contact information by financial advisor defined criteria, wherein a trend comprises a report of changes in values of categories of contact information selected by a financial advisor;

managing workflow of a financial advisor based upon financial advisor defined criteria;

generating call lists directed toward a financial advisor who is attempting to sell investment products, wherein a call list comprises a list of current and potential clients of the financial advisor;

a financial advisor designating delegated tasks, wherein delegated tasks comprise tasks to be completed by a person working at the direction of a financial advisor;

a financial advisor assessing the performance of those assigned to perform the delegated tasks; adding contact information and adding sort criteria to contact information;

a financial advisor testing a hypothesis regarding attributes of collected information, wherein a hypothesis is a predicted trend;

conducting investment product compatibility analysis wherein investment product attributes are compared with contact information of prospective purchasers of investment products; and creating mailing lists based upon the results of the financial advisor's hypothesis test.

* * * * *